US009489471B2

(12) United States Patent
Venkatesh

(10) Patent No.: US 9,489,471 B2
(45) Date of Patent: Nov. 8, 2016

(54) FLASH REDIRECTION WITH CACHING

(71) Applicant: Ramanujam Kaniyar Venkatesh, Madivala (IN)

(72) Inventor: Ramanujam Kaniyar Venkatesh, Madivala (IN)

(73) Assignee: Dell Products L.P., Round Rock, TX (US)

( * ) Notice: Subject to any disclaimer, the term of this patent is extended or adjusted under 35 U.S.C. 154(b) by 267 days.

(21) Appl. No.: 14/316,937

(22) Filed: Jun. 27, 2014

(65) Prior Publication Data

US 2014/0310618 A1 Oct. 16, 2014

Related U.S. Application Data

(63) Continuation-in-part of application No. 13/743,227, filed on Jan. 16, 2013, now Pat. No. 9,354,764, which is a continuation-in-part of application No. 13/539,226, filed on Jun. 29, 2012, and a continuation-in-part of application No. 13/539,224, filed on Jun. 29, 2012, now abandoned, and a continuation-in-part of application No. 13/539,222, filed on Jun. 29, 2012, now abandoned, and a continuation-in-part of application No. 13/539,220, filed on Jun. 29, 2012, now abandoned.

(30) Foreign Application Priority Data

Sep. 28, 2012 (IN) .......................... 3064/DEL/2012
Mar. 13, 2014 (IN) ............................ 638/DEL/2014

(51) Int. Cl.
*G06F 3/0484* (2013.01)
*H04L 29/08* (2006.01)
*G06F 17/30* (2006.01)
*H04L 29/06* (2006.01)

(52) U.S. Cl.
CPC ......... *G06F 17/30899* (2013.01); *H04L 67/04* (2013.01); *H04L 67/42* (2013.01)

(58) Field of Classification Search
CPC . G06F 17/30899; G06F 3/048; H04L 67/04; H04L 67/42; H04L 67/08; H04L 67/10; H04L 67/2814; H04L 29/08072; H04L 29/06; H04L 29/0809; H04L 29/08981; G06Q 30/02
USPC ................................. 709/203, 217; 715/760
See application file for complete search history.

(56) References Cited

U.S. PATENT DOCUMENTS 7,702,750 B2    4/2010  Momtchilov et al. ........ 709/219
7,769,895 B1    8/2010  Williams et al. ............. 709/246

(Continued)

OTHER PUBLICATIONS

"Configuring HDX MediaStream Flash Redirection ont eh Server", Citrix Systems Inc., 2011, retrieved from <http://support.citrix.com/proddocs/topic/xenapp65-admin/hd-flash-configure-server-ad.html>.

(Continued)

*Primary Examiner* — Alina N Boutah
(74) *Attorney, Agent, or Firm* — Baker Botts L.L.P.

(57) ABSTRACT

In particular embodiments, a server loads in a browser a webpage including flash content including an ActionScript, the ActionScript including at least one function. The browser loads a flash redirection plugin and requests the plugin to execute the ActionScript. The plugin determines whether a cache at the server includes the function, and if the cache includes the function, the plugin determines a result associated with the function in the cache and returns the result to the browser.

17 Claims, 24 Drawing Sheets

(56) References Cited

U.S. PATENT DOCUMENTS

| | | | |
|---|---|---|---|
| 8,019,811 B1* | 9/2011 | Britto | G06F 9/542 709/203 |
| 8,103,740 B1 | 1/2012 | Abramov et al. | 709/217 |
| 8,156,239 B1 | 4/2012 | Ashrifi | 709/231 |
| 8,170,123 B1 | 5/2012 | Hobgood et al. | 375/240.26 |
| 8,190,752 B1* | 5/2012 | Xia | H04L 67/06 709/229 |
| 8,219,598 B1* | 7/2012 | Appleton | G06F 21/6263 707/705 |
| 8,613,620 B2* | 12/2013 | Barasch | A63B 24/0003 434/247 |
| 8,689,273 B2 | 4/2014 | Reisman | 725/133 |
| 8,806,040 B2 | 8/2014 | Shah | 709/229 |
| 8,839,419 B2 | 9/2014 | Hudis et al. | 726/22 |
| 2003/0217173 A1 | 11/2003 | Butt et al. | 709/237 |
| 2005/0177428 A1 | 8/2005 | Ganz | 705/14 |
| 2007/0038718 A1 | 2/2007 | Khoo et al. | 709/206 |
| 2007/0192329 A1 | 8/2007 | Croft et al. | 707/10 |
| 2009/0287772 A1 | 11/2009 | Stone et al. | 709/203 |
| 2009/0288098 A1 | 11/2009 | Abd-El-Malek et al. | 719/312 |
| 2010/0106798 A1 | 4/2010 | Barreto et al. | 709/217 |
| 2010/0138744 A1 | 6/2010 | Kamay et al. | 715/716 |
| 2010/0228963 A1* | 9/2010 | Kassab | G06Q 30/02 713/150 |
| 2010/0253697 A1 | 10/2010 | Rivera | 345/589 |
| 2011/0066841 A1* | 3/2011 | Goodrow | H04L 43/0894 713/150 |
| 2011/0145431 A1 | 6/2011 | Momchilov et al. | 709/231 |
| 2011/0258623 A1* | 10/2011 | Wagner | H04N 21/41407 718/1 |
| 2012/0047542 A1 | 2/2012 | Lewis et al. | 725/97 |
| 2012/0284632 A1 | 11/2012 | Baird | 715/749 |
| 2012/0317218 A1* | 12/2012 | Anderson | H04N 21/4786 709/206 |
| 2012/0317295 A1 | 12/2012 | Baird | 709/228 |
| 2012/0324098 A1* | 12/2012 | De Jager | G06Q 30/02 709/224 |
| 2013/0086138 A1 | 4/2013 | Noguchi | 709/201 |
| 2013/0117416 A1 | 5/2013 | Sun et al. | 709/219 |
| 2013/0326583 A1 | 12/2013 | Freihold et al. | 726/3 |
| 2014/0304379 A1* | 10/2014 | Samaniego | H04N 21/47205 709/221 |
| 2016/0087933 A1* | 3/2016 | Johnson | H04L 61/1564 709/245 |

OTHER PUBLICATIONS

"HP Thin Clients—HP RDP Enhancements for Flash Redirection", HP Support Document, 2012, retrieved from <http://h20000.www2.hp.com/bizsupport/TechSupport/Documents.jsp?lang=en&cc=us&taskid=115&prodSeriesId=4306187&prodTypeId=12454&objectDc02878390.

Citrix white paper "HDX Technology," 2011, url: https://suppport.citrix.com/servlet/KbServlet/download/29626-102-684449/HDX%2520Optimization%2520and%2520Best%2520Practices.pdf.

David Stone "IIDX Mediastream flash redirection," Aug. 30, 2011, url: http://blogs.citrix.com/2011/08/30/174168623/.

Tom Clarke, "The Web's favorite video and animation player," Dec. 2011, http://web.archive.org/web/20111230142519/http://adobe-flash-player.en.softonic.com/.

* cited by examiner

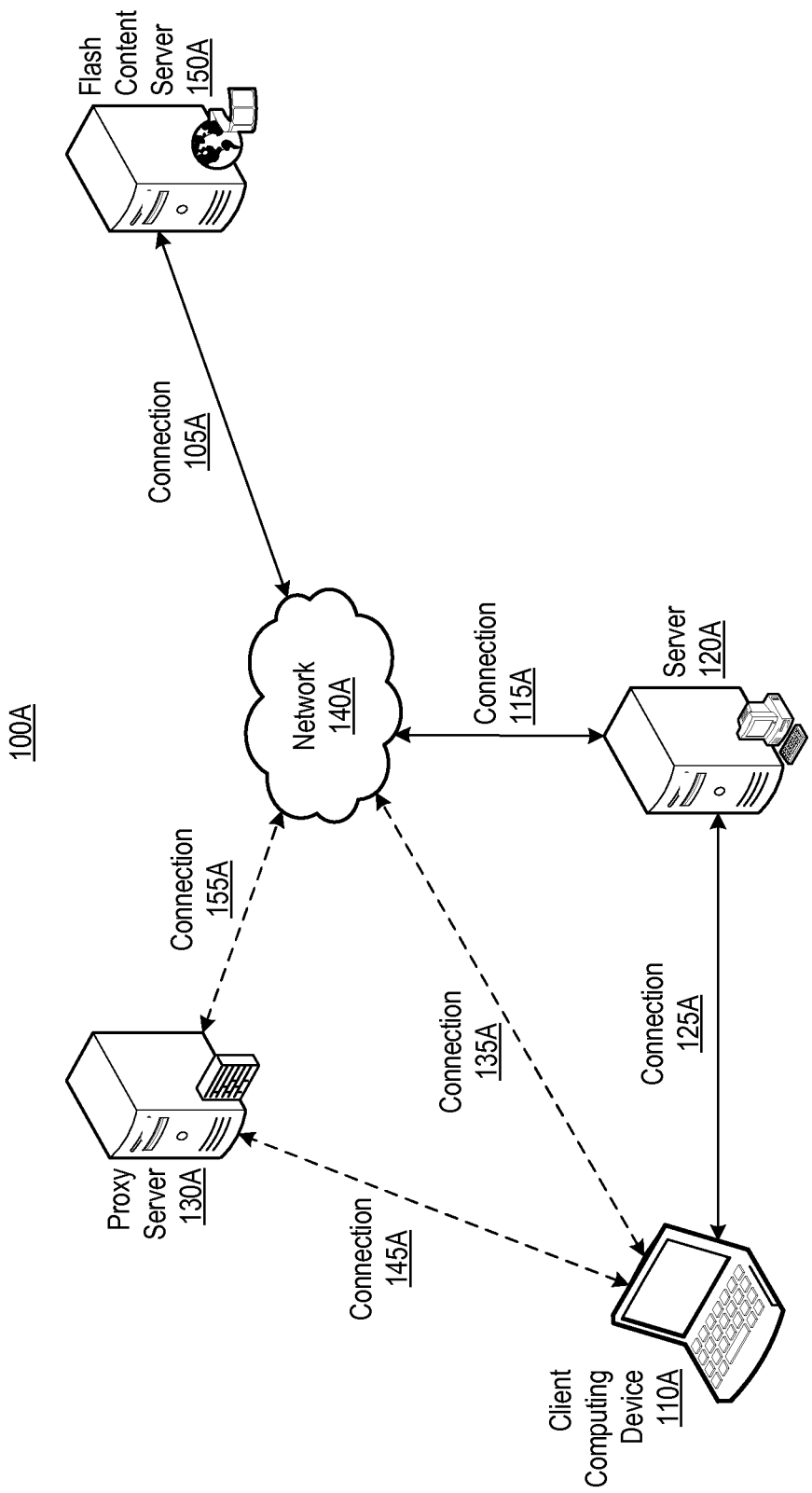

FLASH REDIRECTION WITH CACHING

PRIORITY

This application claims the benefit under 35 U.S.C. §119 (a) of Indian Patent Application No. 638/DEL/2014 filed 6 Mar. 2014, which is incorporated herein by reference.

This application is a continuation-in-part under 35 U.S.C. §120 of U.S. patent application Ser. No. 13/743,227 filed 16 Jan. 2013, which claims the benefit under 35 U.S.C. §119(a) of Indian Patent Application No. 3064/DEL/2012 filed 28 Sep. 2012, and which is a continuation-in-part under 35 U.S.C. §120 of U.S. patent application Ser. No. 13/539,226 filed 29 Jun. 2012, a continuation-in-part under 35 U.S.C. §120 of U.S. patent application Ser. No. 13/539,224 filed 29 Jun. 2012, a continuation-in-part under 35 U.S.C. §120 of U.S. patent application Ser. No. 13/539,222 filed 29 Jun. 2012, and a continuation-in-part under 35 U.S.C. §120 of U.S. patent application Ser. No. 13/539,220 filed 29 Jun. 2012, all of which are incorporated herein by reference.

FIELD

The disclosure relates in general to client-server computer systems, and more particularly to presenting flash content.

BACKGROUND

A user of a client computing device may initiate a remote desktop protocol (RDP) session with a server via any remote desktop protocol client application executing on the client computing device (for example, Microsoft Remote Desktop Protocol, Citrix Independent Computing Architecture, VMware Personal Computer over Internet Protocol, etc.). The user may attempt to load a webpage that includes flash content (e.g., a flash video) via a web browser executing on the server. In response, the flash content of the webpage may be loaded on the server and transmitted as a bitmap to the client computing device, allowing the user to see an image associated with the webpage.

BRIEF DESCRIPTION OF THE DRAWINGS

FIG. 1A is a block diagram illustrating an example of a first system for presenting flash content.

DETAILED DESCRIPTION

Figure 1B:
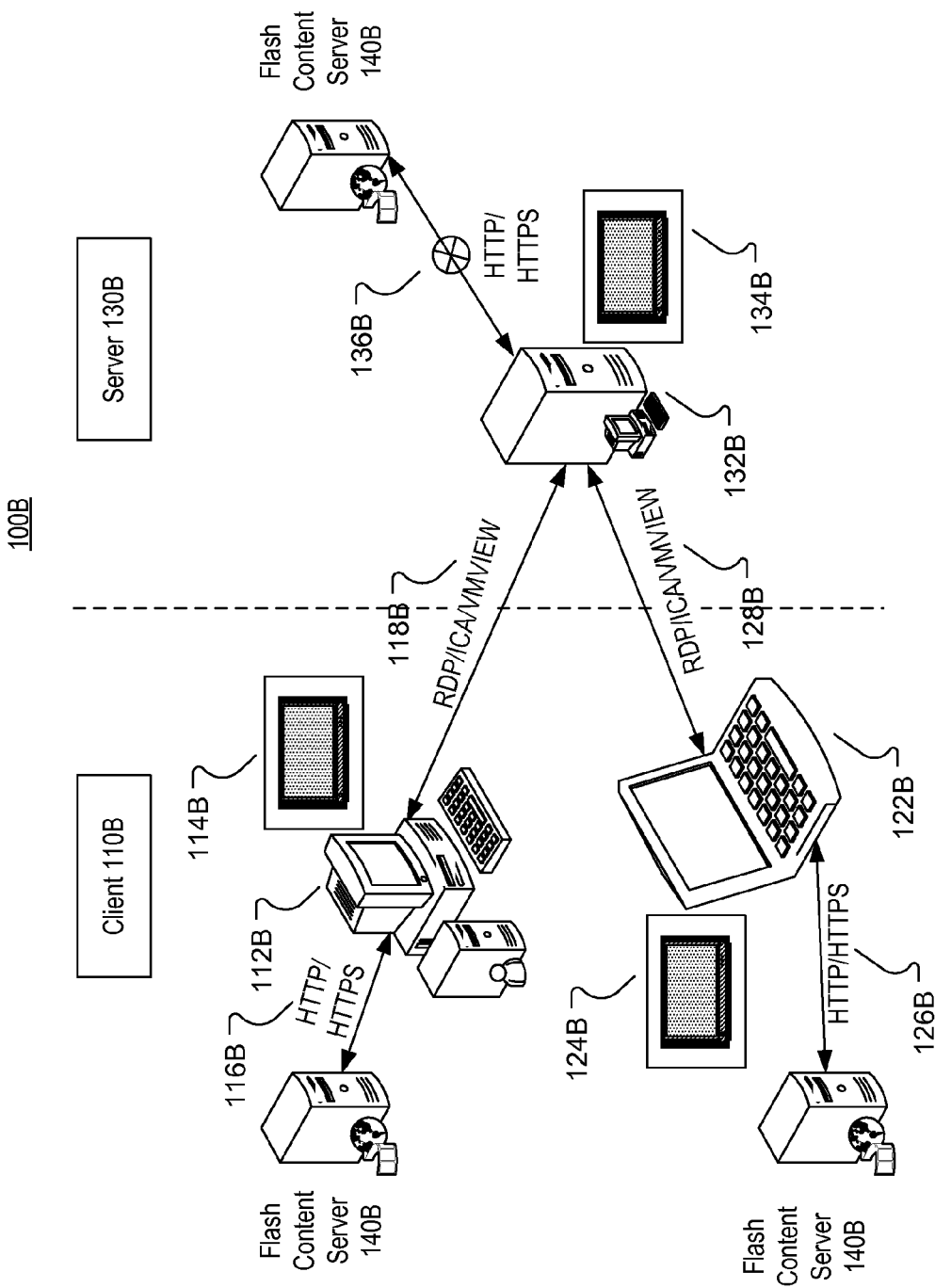
FIGS. 1B-1C illustrate examples of components of the first system for presenting flash content of FIG. 1A.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

A user of a client computing device may initiate a remote desktop protocol session with a server via a remote desktop protocol client application executing on the client computing device. The remote desktop protocol may be, for example, Microsoft Remote Desktop Protocol® (RDP), Citrix Independent Computing Architecture® (ICA), VMware VMview, VMware Remote Desktop Protocol, or VMware Personal Computer Over Internet Protocol (PCOIP). The user may instantiate a web browser on the server and data from the web browser may be displayed on the client computing device via the remote desktop protocol client application. The web browser may display a webpage that includes flash content, for example, a flash video that may be played via a flash player application (e.g., Adobe Flash Player®).

In some examples, a computer program product may transmit to the client computing device all flash content of a webpage or, alternatively, user-selected flash content of the webpage. The flash content may be rendered at the server and transmitted to the client computing device via the remote desktop protocol. Alternatively, the computer program product may redirect the flash parameters (e.g., a web address or uniform resource locator of flash content) to the client computing device for downloading flash content at the client computing device via an Internet connection of the client computing device and for rendering on the client computing device.

In some examples, the decision of flash content rendering may be manual. A compatibility list listing which flash content items are rendered on the server and which content items are rendered on the client may be provided. In some examples, a flash player may be required on the client computing device. In other examples, the flash player may not be required on the client computing device. In some examples, Internet connectivity at the client computing device may be required. In other examples, Internet connectivity at the client computing device may not be required. In some examples of the compatibility list approach, a server (e.g., a login server) may fetch data from listed website(s) and pass the data back to the client, e.g., via a tunnel.

The present disclosure may, in particular embodiments, be supported in multiple web browsers (e.g., Internet Explorer® versions 6, 7, 8, 9, and/or web browser implementing Netscape Plugin Application Programming Interface (NPAPI), such as Chrome® and Mozilla Firefox®) and on multiple platforms (e.g. Windows or Linux). Transparent flash content may be supported by the present disclosure in particular embodiments. A transparent flash content item may include, for example, a flash video having a non-rectangular shape (e.g., a circular shape) or a flash video having hypertext markup language (HTML) content from a webpage in its background (e.g., a video overlaying HTML images or text that occasionally becomes transparent, allowing the overlayed HTML images or text to be viewed).

Particular embodiments include, but are not limited to: (1) flash redirection, (2) intelligent fallback to flash acceleration, (3) flash redirection via proxy server if the client computing device is not directly connected to the Internet but is connected to the Internet via a proxy server, (4) flash redirection with a tunneling server (which may be the same as the remote desktop protocol server) if the client computing device does not have access to the Internet either directly or via the proxy server, and/or (5) selective redirection of flash content item(s) on a webpage.

Particular embodiments provide one or more of the following: (1) flash redirection with flash acceleration, (2) flash redirection with proxy, (3) automatic tunneling of flash redirection, (4) selective redirection of flash, (5) transparent flash support, (6) flash redirection support on other browsers, for example, Mozilla Firefox® and Chrome®, and/or (7) automatic reloading of a webpage upon reconnecting to a disconnected session.

Particular embodiments may allow a user to play flash (e.g., Adobe Flash®) content at thin clients rather than playing at a server and consuming server resources. Particular embodiments may allow users to experience smoother and more reliable playback of flash content. By playing the flash content at the client, flash redirection may reduce the server and network load and may result in greater scalability while improving user experience. Flash content may include, for example, videos and animations. If the client supports flash redirection, the client may, in particular embodiments, receive the original compressed multimedia stream from the web server (e.g., flash content server) and decode it locally for display. As a result, bandwidth usage may be decreased as the data transmitted over the network may be compressed video instead of a succession of bitmaps. The bandwidth usage may remain the same when a video window is resized or when played in full-screen mode. Flash redirection may work with Internet Explorer and NPAPI browsers like Chrome and Firefox. In particular embodiments, under seamless flash redirection, all the flash content of a page may be redirected to the client, as illustrated, for example, in FIG. 1B.

If a flash player is not present at the client, flash acceleration (see, e.g., FIG. 8B or 9B) may take place automatically for the flash content at the server rather than remote desktop protocol (e.g., RDP, ICA, or VMVIEW) rendering. Flash acceleration may enable thin client users to experience improved flash video content performance in a remote computing environment. In some examples, flash acceleration transcodes the native flash media stream to a high bit rate motion JPG content that is then delivered to the client for fast local rendering. Since the resulting "images" are "redirected" over a separate virtual channel to the client, greater control of frame rate and compression may be provided. In this example, a flash player need not be installed on the client. A user of a remote desktop protocol client application may have an option, the settings for which may be stored in the server, to select flash acceleration and/or flash redirection.

If a flash player is present at the client but the client does not have access to the Internet, then flash redirection may happen through an external proxy server (e.g., proxy server 130A, 111C, or 121C). The external proxy server may download the flash content and then send the flash content to the clients. Automatic detection of the proxy server may happen at the client. If the proxy server is not present in the network, then flash tunneling (see, e.g., FIG. 2A or 2B) may happen through the login server (e.g., remote desktop protocol server 120A or 208B).

In particular embodiments, a user may selectively redirect the flash on a website at the server. As a result, the user may avoid redirecting the flash content items which are not of his/her interest, for example, advertisements. This may be achieved, for example, by the user selecting (e.g., single clicking via a mouse, double clicking via a mouse, or touching via a touch screen) on the flash content item. This mechanism is called tapping. Once the user taps a particular flash content item on a website, the content items may be redirected. When the user opens the website on a subsequent occasion, particular embodiments may detect the tapped flash content and start redirecting the flash to clients (e.g., thin clients) automatically, such that the user does not need to tap the desired flash content item(s) again. In some examples, by default all the flash content items may be rendered at the server and the flash content item(s) may be redirected to client by tapping (see, e.g., FIG. 8C or 9C).

Transparent flash allows the flash content to be in a shape other than a rectangle, including, for example, a circle. In some implementations of flash redirection, transparent flash is not supported. In particular embodiments of flash redirection, transparent flash is supported, and all flash content is drawn in the same fashion as in a browser executing locally on the client computing device.

In some examples, when a session is disconnected while redirecting the flash content and logged into again, all the flash content which was played and redirected in the previous session may start redirecting to the client automatically by reloading the webpage for a new session. In particular embodiments, when a user disconnects the session while redirecting the flash and later resumes the session, the user may see a blank area at the locations of flash content on the webpage. The user may see a white area at the server (in the client remote desktop protocol application window representing the server) due to the flash redirection and the flash content being played locally at client. A disconnect of a session may allow the server to retain all or a portion of the process(es) running on the server during the session.

In particular embodiments, when a web browser (e.g., Internet Explorer, Firefox, or Chrome) executing on the server loads a webpage which has flash content, the flash content items on the webpage are monitored at the server, and all the flash parameters are redirected from the server to a client. The client may include a flash player and may pass all the parameters from the server to the flash player at the client. Some webpages may include flash content that depends on the execution of ActionScript, JavaScript, or browser calls (e.g. NPN calls). As an example, a user viewing flash video content may wish to "pop out" the video embedded in a webpage to a standalone window and continue playing the video from where it left off; this may depend on the execution of JavaScript. As another example, a flash video player may be resized (e.g. YouTube® options to resize small size player to large size player or large size player to small size player) during viewing, and this may also depend on the execution of JavaScript. In particular embodiments, the web browser executing on the server may load a webpage which has flash content, and which depends on the execution of an ActionScript. In such cases, the server may pass the ActionScript to the client for remote execution at the client flash player, to be described in further detail below. In particular embodiments, the result of Action Script calls (e.g. calls forwarded from the server to the client) may be cached at the server, to be described in further detail below. In particular embodiments, the webpage may have flash content that depends on the execution of a JavaScript. In such cases, the client may pass the JavaScript to the server for remote execution at the server's browser, to be described in further detail below. In particular embodiments, the webpage may have flash content that depends on the execution of one or more NPN calls. In such cases, the client may pass the NPN calls to the server for remote execution at the server's browser, to be described in further detail below.

A flash redirection module (e.g., flash redirection client module 435) may check for the flash player at the client. If present, the flash redirection module may wait for flash parameters from the server. If there are any parameters, the flash redirection module may start playing in a local flash player. If the flash player is not present at the client, flash acceleration may be used instead of flash redirection.

Flash redirection at the client may include checking for access to an outside network (e.g., the Internet). If the client has access to the outside network, the client may fetch the data directly for the flash player. If the client does not have access to the outside network, the client may look for an external proxy and forward all the requests of its flash player to the proxy server. If an external proxy is not found, the client may query the server through tunneling. The tunneling server (which may be the same machine as the remote desktop protocol server) may fetch the data and pass back to the client. The tunneling server may act like a pass through server. The tunneling server may forward the client requests to the actual server (the remote desktop protocol server) and pass back the response to client. If tunneling is used and the server is over a wide area network (WAN), WAN Accelerator/Optimizer may be used to improve the performance.

In particular embodiments, the flash content on the webpage may be monitored and a data repository may be prepared. Flash redirection may display a small icon near flash content item(s) on the webpage. When the user selects (e.g., clicks) on the icon, flash redirection may redirect all the associated flash parameters to the client. The client may include a flash player and pass all the parameters from a server to the flash player.

Example of First System for Presenting Flash Content

FIG. 1A illustrates an example of a first system 100A for presenting flash content. As shown, the system 100A includes a client computing device 110A, a server 120A, a proxy server 130A, and a flash content server 150A. One or more of the client computing device 110A, the server 120A, the proxy server 130A, and the flash content server 150A (e.g., web server) may be connected to a network 140A (e.g., the Internet). While FIG. 1 includes only a single client computing device 110A, server 120A, proxy server 130A, and flash content server 150A, particular embodiments may be implemented in conjunction with one or more client computing devices, servers, proxy servers, or flash content servers. In some aspects, particular embodiments may be implemented without one or more of the above-listed components (e.g., without a proxy server 130A).

The client computing device 110A may be a laptop computer, a desktop computer, a mobile phone, a tablet computer, a personal digital assistant (PDA), or any similar device. As illustrated, the client computing device is connected to the server 120A via a connection 125A. The connection 125A may be a remote desktop protocol connection. The client computing device 110A may include a flash player (e.g., Adobe Flash Player®) or a remote desktop protocol client application. One example of the client computing device 110A is described in detail in conjunction with FIG. 4.

A remote desktop protocol connection may, among other things, allow for visual data from the server 120A to be displayed remotely on the client computing device 110A. The client computing device 110A may be able to cause execution of software application(s) residing on the server 120A. A remote desktop connection may use a remote desktop protocol. Example remote desktop protocols include Microsoft Remote Desktop Protocol® (RDP), Citrix Independent Computing Architecture® (ICA), and VMware VMview®.

In one example, the connection 125A between the client computing device 110A and the server 120A is independent of the network 140A. For example, the network 140A may be the Internet, and the client computing device 110A may be connected to the server 120A via one or more of a local network, a corporate intranet, a direct wired connection, or a direct wireless connection. Alternatively, the client computing device 110A may be connected to the server 120A via a connection 125A (e.g., a remote desktop protocol connection) over the network 140A.

The server 120A may be a remote desktop protocol server. In some aspects, the server may be an enterprise computer (e.g., an office desktop computer) that is configured to be accessed remotely (e.g., from an employee's home or a field office) via a remote desktop protocol. Alternatively, the server 120A may be implemented as a server farm including multiple machines, a single machine with a single processor, or a multi-processor machine. One example of the server 120A is described in detail in conjunction with FIG. 3.

In some examples, the client computing device 110A may be connected to the network 140A directly via a connection 135A. The connection 135A may be a hypertext transfer protocol (HTTP) or hypertext transfer protocol secure (HTTPS) connection. In some examples, the client computing device 110A may be connected to the network 140A via the proxy server 130A. The connection 145A between the client computing device 110A and the proxy server 130A may be a HTTP or HTTPS connection, and the connection 155A between the proxy server 130A and the network 140A may be a HTTP or HTTPS connection. In some aspects, the client computing device 110A may not be connected to the network 140A except via the server 120A. The connection 115A of the server 120A to the network 140A may be a HTTP connection.

The proxy server 130A may be configured to allow a computer (e.g., a client computing device 110A) connecting to the proxy server 130A to connect to the network 140A. The proxy server 130A may be configured to filter out some content (e.g., webpages) to prevent users of computers connected to the network 140A via the proxy server 130A from accessing that content. For example, in an enterprise setting, an employer may use the proxy server 130A to prevent its employees from accessing social networking content, while allowing them to access other Internet content.

Particular embodiments may be implemented without the proxy server 130A or without one or more of the connections 135A, 145A, and 155A.

The flash content server 150A may be, for example, a web server that includes flash content (e.g., a YouTube® server).

Flash content may include video files or transparent flash content items. A transparent flash content item may include, for example, a flash video having a non-rectangular shape (e.g., a circular shape) or a flash video having hypertext markup language (HTML) content from a webpage in its background (e.g., a video overlaying HTML images or text that occasionally becomes transparent, allowing the overlayed HTML images or text to be viewed). The flash content server 150A is connected to the network 140A via a connection 105A. The connection 105A may be a HTTP or HTTPS connection.

HTTP may be used, for example, to fetch flash content by the client computing device 110A. HTTPS may be used, for example, to get flash content in a secure manner by the client computing device.

FIG. 1B illustrates a system 100B that includes examples of components (110B, 112B, 114B, 116B, 118B, 122B, 124B, 126B, 128B, 130B, 132B, 134B, 136B, and 140B) of the first system 100A for presenting flash content of FIG. 1A.

As shown in FIG. 1B, in one example embodiment, server 132B on server side 130B is displaying, via a remote desktop protocol server application, a webpage that includes a flash video 134B (or other flash content item) from flash content server 140B. The server 132B is connected to clients 112B and 122B via a remote desktop protocol connection 118B and 128B (e.g., RDP, ICA, or VMview). Each client 112B or 122B on client side 110B is connected to the flash content server 140B via a hypertext transfer protocol (HTTP) connection 116B or 126B. The clients 112B or 122B receive the webpage as a bitmap via the remote desktop protocol connection 118B or 128B and the clients 112B or 122B receive the flash video 114B or 124B via the HTTP connection 116B or 126B to the flash content server 140B.

Figure 1C:
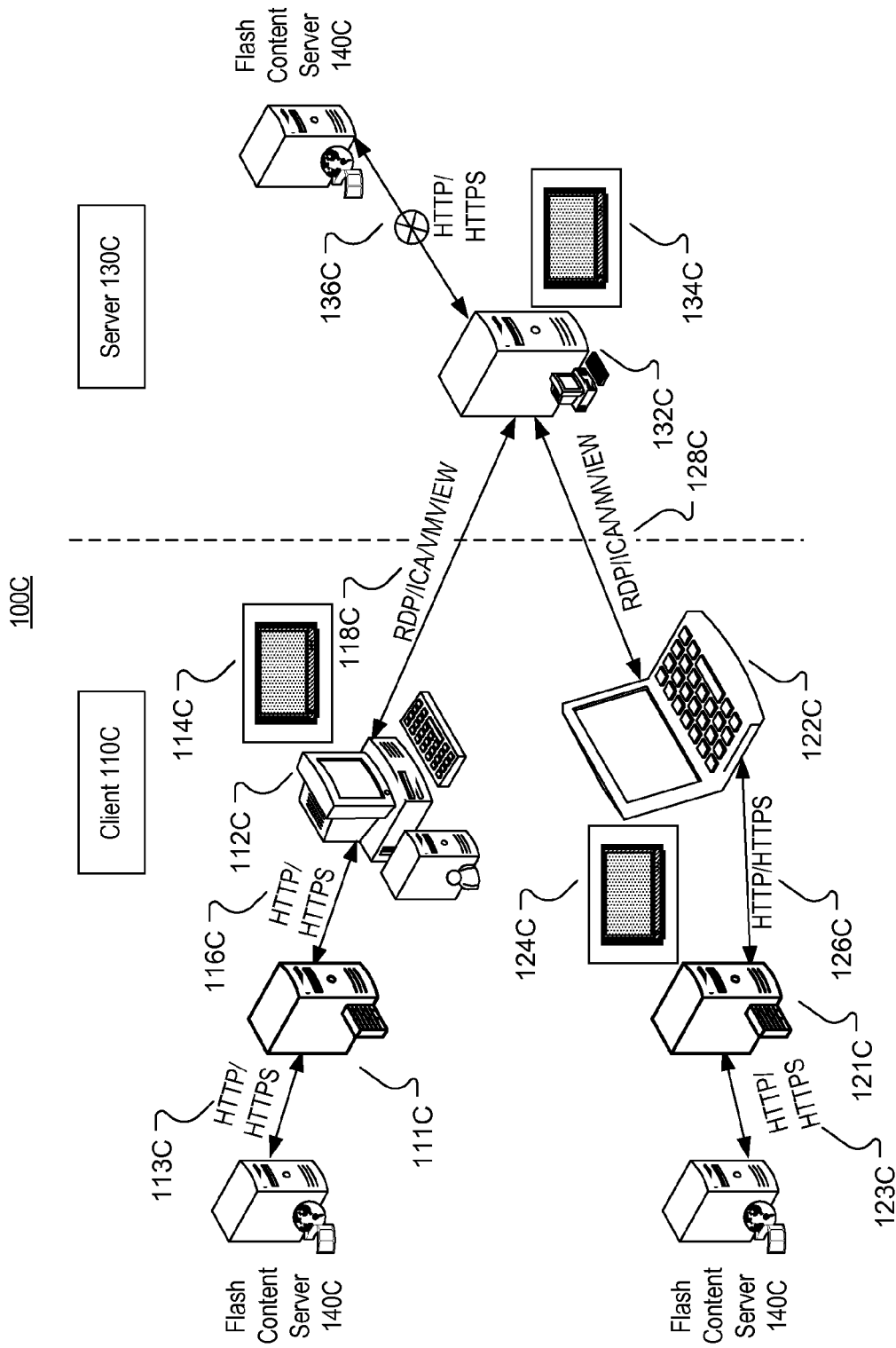

FIG. 1C illustrates a system 100C that includes examples of components (110C, 111C, 112C, 113C, 114C, 116C, 118C, 121C, 122C, 123C, 124C, 126C, 128C, 130C, 132C, 134C, 136C, and 140C) of the first system 100A for presenting flash content of FIG. 1A.

As shown in FIG. 1C, in one example embodiment, server 132C on server side 130C is displaying, via a remote desktop protocol server application, a webpage that includes a flash video 134C (or other flash content item) from flash content server 140C. The server 132C is connected to clients 112C and 132C via a remote desktop protocol connection 118C and 128C (e.g., RDP, ICA, or VMview). Each client 112C or 122C on client side 110C is connected to a proxy server 111C or 121C via a HTTP connection 116C or 126C. Each proxy server 111C or 121C is connected to the flash content server 140C via a HTTP connection 113C or 123C. The clients 112C or 122C receive the webpage as a bitmap via the remote desktop protocol connection 118C or 128C and the clients 112C or 122C receive the flash video 114C or 124C via the HTTP connections 113C and 116C or 123C and 126C and over the proxy server 111C or 121C to the flash content server 140C.

Example of Second System for Presenting Flash Content

Figure 2A:
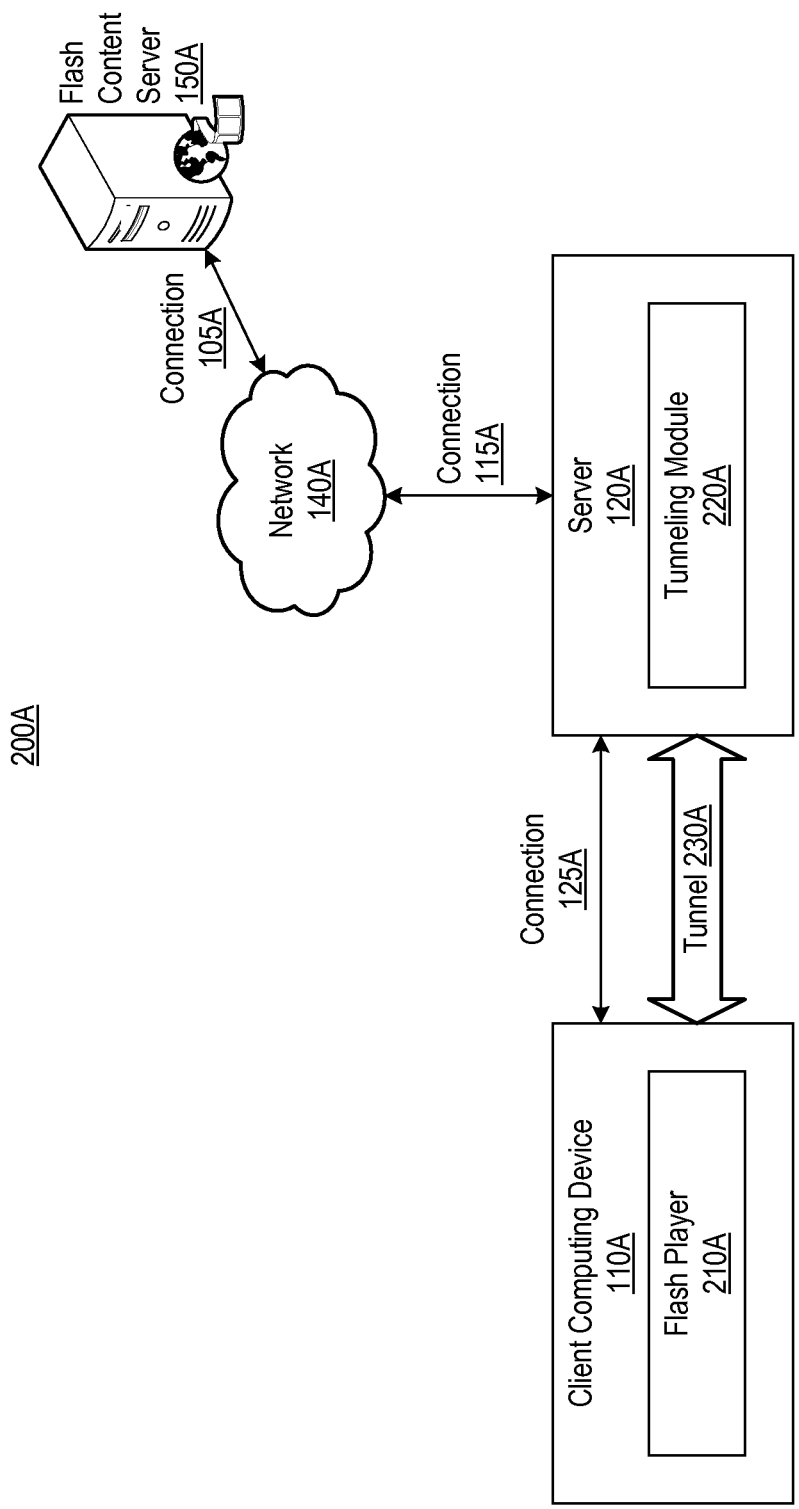
FIG. 2A is a block diagram illustrating an example of a second system for presenting flash content.

FIG. 2A is a block diagram illustrating an example of a second system 200A for presenting flash content. As shown, the system 200A includes the client computing device 110A, the server 120A, and the flash content server 150A.

As illustrated, the client computing device 110A includes a flash player 210A. The flash player 210A may be configured to play flash content, for example flash videos or transparent flash content items. The flash player 210A may be, for example, Adobe Flash Player®. Also, as illustrated, the client computing device 110A is not directly connected to the network 140A. Instead, the client computing device 110A is configured to access the network via the connection 125A to the server and the connection 115A of the server to the network.

The connection 125A between the client computing device 110A and the server 120A may be a remote desktop protocol connection. The client computing device 110A may transmit to the server 120A user interface data (e.g., mouse operations and keyboard clicks entered by a user of the client computing device) via the connection 125A. The server 120A may transmit to the client computing device 110A a bitmap including image data to be displayed on a display unit (e.g., a screen) of the client computing device 110A via the connection 125A.

As illustrated, the server 120A includes a tunneling module 220A. The tunneling module may be configured to, in an event that the server 120A is connected to the client computing device 110A via a connection 125A (e.g., a remote desktop protocol connection) and a web browser executing on the server 120A and displayed on the client computing device 110A via a remote desktop protocol client application is accessing a flash content item, create a tunnel 230A. The tunnel 230A may be configured to transmit flash content from the server 120A to the client 110A as a flash content file, rather than as a bitmap. As a result, the client computing device 110A may be able to play the flash content via the flash player 210A, improving the quality of the playback of the flash content (over the bitmap transmitted via connection 125A).

The flash content may be received at the server 120A from the flash content server 150A via the network 140A. The server 120A may be connected with the flash content server 150A via connections 115A and 105A.

Figure 2B:
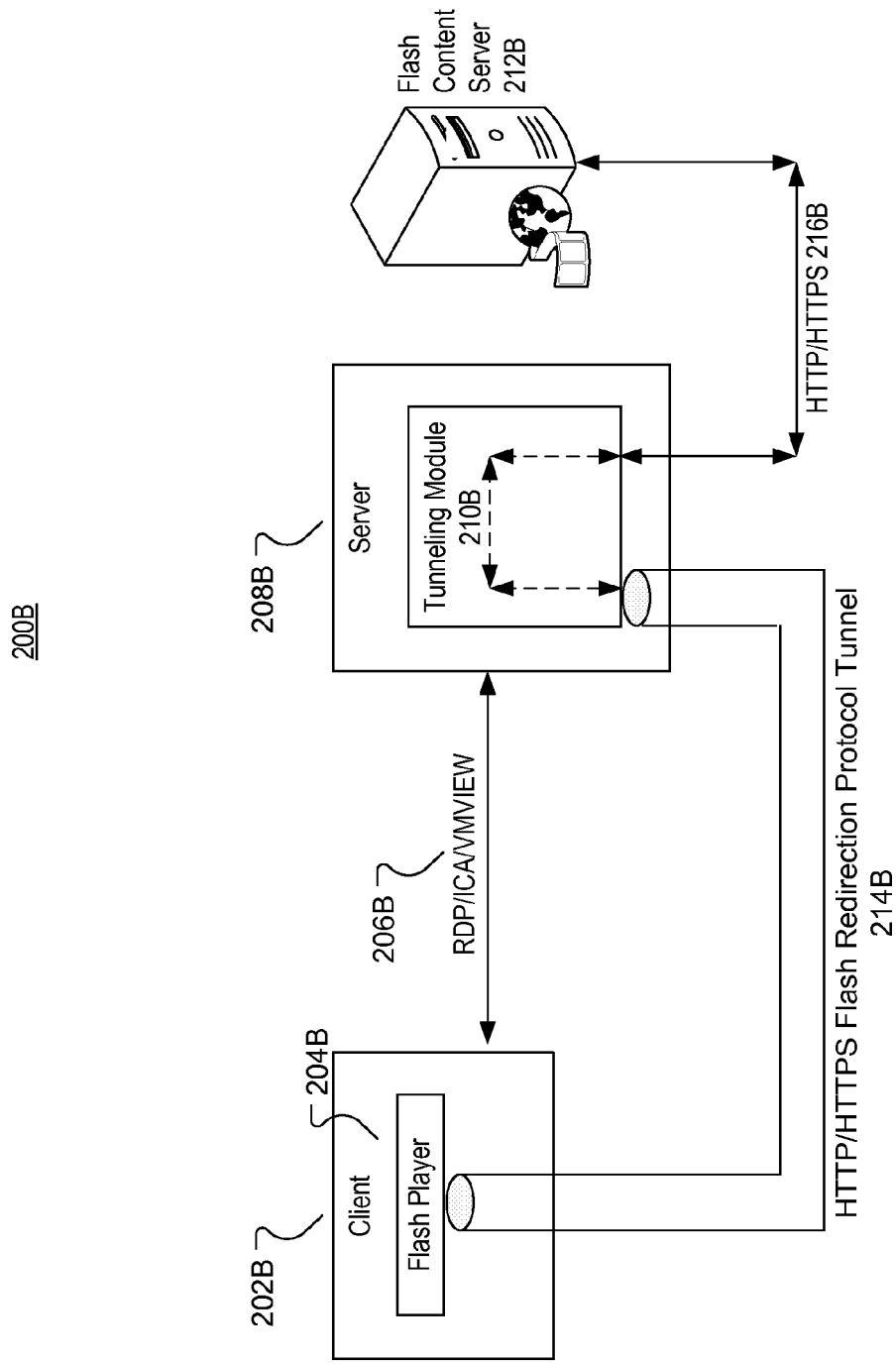
FIG. 2B illustrates examples of components of the second system for presenting flash content of FIG. 2A.

FIG. 2B illustrates a system 200B that includes examples of components (202B, 204B, 206B, 208B, 210B, 212B, 214B, and 216B) of the second system 200A for presenting flash content of FIG. 2A.

Example of Server

Figure 3:
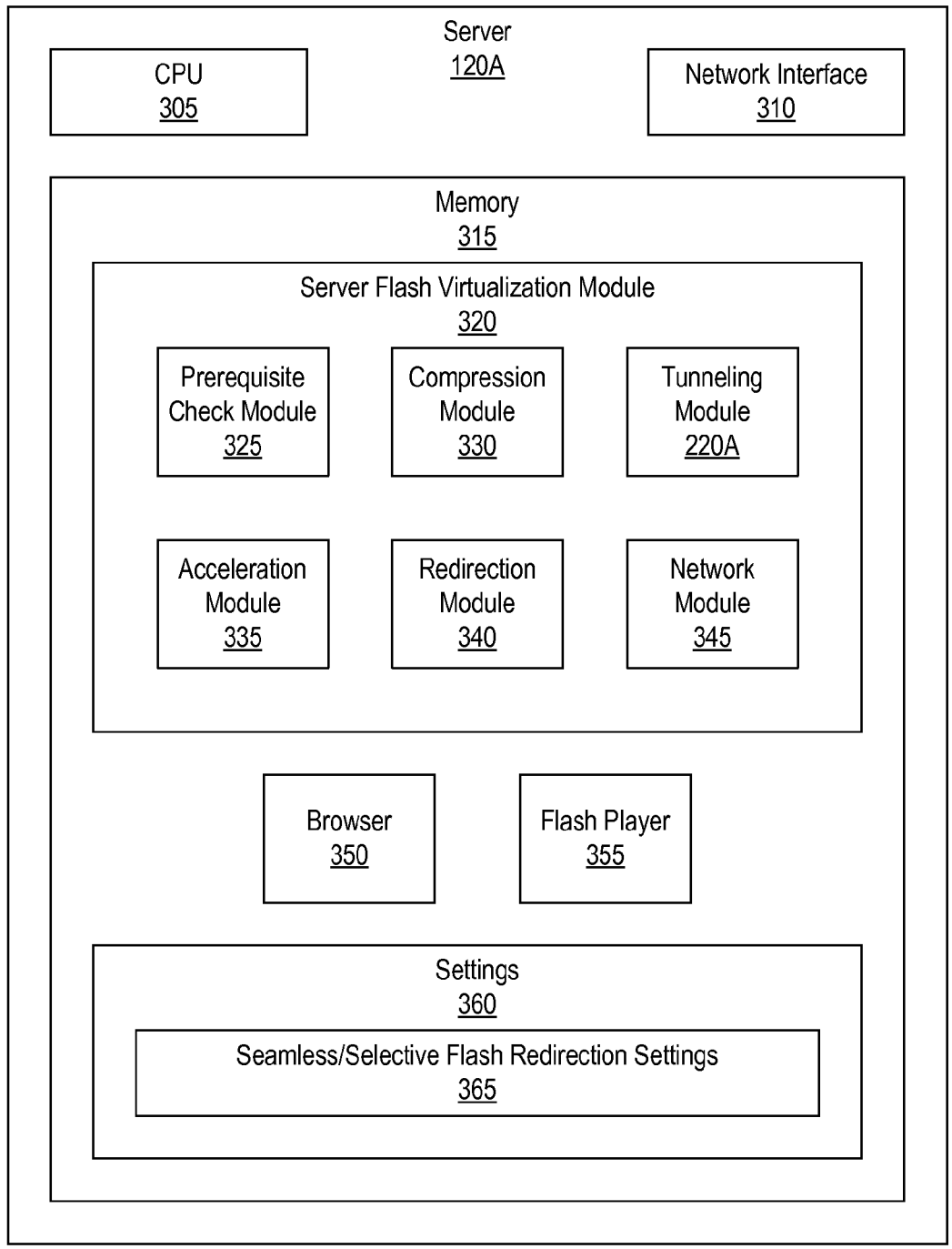
FIG. 3 is a block diagram illustrating an example of the server of FIG. 1A or 2A.

FIG. 3 is a block diagram illustrating an example of the server 120A.

As shown, the server 120A includes a central processing unit (CPU) 305, a network interface 310, and a memory 315. The CPU 305 may include one or more processors configured to execute computer instructions that are stored in a computer-readable medium, for example, the memory 315. The network interface 310 may be configured to allow the server 120A to transmit and receive data in a network, e.g., network 140A of FIG. 1A. The network interface 310 may include one or more network interface cards (NICs). The memory 315 stores data or instructions. The memory 315 may be one or more of a cache unit, a storage unit, an internal memory unit, or an external memory unit. As illustrated, the memory 315 includes a server flash virtualization module 320, a browser 350, a flash player 355, and settings 360.

As illustrated, the server flash virtualization module 320 includes a prerequisite check module 325, a compression module 330, the tunneling module 220A, an acceleration module 335, a redirection module 340, and a network module 345. In particular embodiments, redirection module 340 includes a flash redirection proxy plugin, which may support the function of a flash plugin at client computing device 110A that depend on scripts (e.g. JavaScript) or browser calls (e.g. NPN calls). The proxy plugin may, for example, work to redirect flash parameters from the browser of the server to the flash player of the client. An example of an operation of the server flash virtualization module 320 and the components 325, 330, 220A, 335, 340, and 345 thereof is provided in conjunction with FIGS. 8A-8H.

The browser 350 is configured to provide data from webpages for display at a client (e.g., client computing device 110A) via a remote desktop protocol client application executing at the client. Some of the webpages may include flash content. Example browsers that may correspond to browser 350 include Microsoft Internet Explorer®, Mozilla Firefox®, or Google Chrome Browser®.

The flash player 355 executing on the server 120A may be configured to provide output based on flash content for display at the client via the remote desktop protocol client application executing at the client. For example, the flash player 355 may place image data based on flash content into a bitmap for transmission to the client.

The settings 360 include settings of the server 120A. As shown, the settings 360 include seamless or selective flash redirection settings 365. At any time, the seamless or selective flash redirection settings 365 indicate either (a) seamless flash redirection or (b) selective flash redirection. Under seamless flash redirection, all flash content from a webpage viewed in the browser 350 during a remote desktop protocol session with a client is redirected to the client for playing in the flash player 210A of the client. Under selective flash redirection, flash content selected by a user of the client (e.g., via operation of a mouse on the client) is redirected to the client for playing in the flash player 210A of the client. Under selective flash redirection, flash content that is not selected by the user is rendered locally at the server 120A via operation of the flash player 355 of the server and transmitted to the client within a bitmap via the remote desktop protocol connection. Selective flash redirection is described in detail in conjunction with FIGS. 8C and 9C.

Example of Client Computing Device

Figure 4:
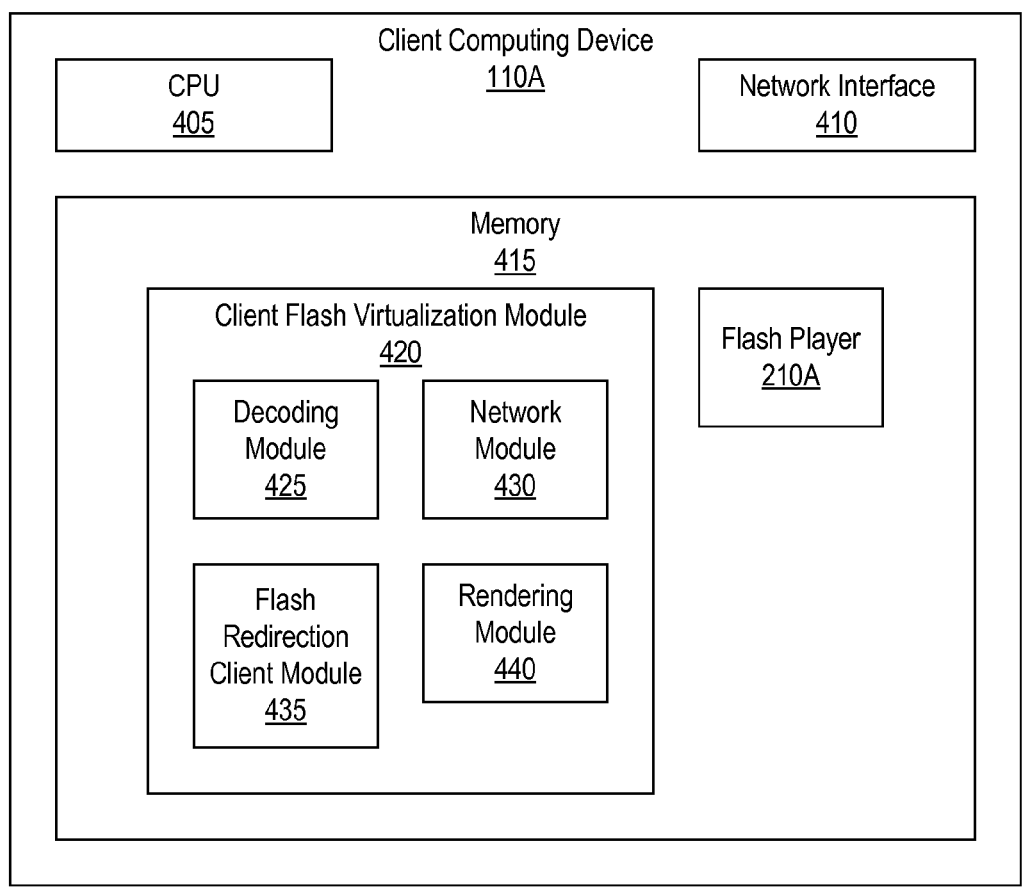
FIG. 4 is a block diagram illustrating an example of the client computing device of FIG. 1A or 2A.

FIG. 4 is a block diagram illustrating an example of the client computing device 110A.

As shown, the client computing device 110A includes a central processing unit (CPU) 405, a network interface 410, and a memory 415. The CPU 405 may include one or more processors configured to execute computer instructions that are stored in a computer-readable medium, for example, the memory 415. The network interface 410 is configured to allow the client computing device 110A to transmit and receive data in a network, e.g., network 140A of FIG. 1A. The network interface 410 may include one or more network interface cards (NICs). The memory 415 stores data or instructions. The memory 415 may be one or more of a cache unit, a storage unit, an internal memory unit, or an external memory unit. As illustrated, the memory 415 includes a client flash virtualization module 420 and a flash player 210A.

As illustrated, the client flash virtualization module 420 includes a decoding module 425, a network module 430, a flash redirection client module 435, and a rendering module 440. In particular embodiments, flash redirection client module 435 includes a flash redirection proxy browser, which may support the function of a browser at server 120A that depend on scripts (e.g. ActionScript). The proxy browser may, for example, be a container for the flash player and may be independent of any browser operating at the server and be independent of the platform of the client (e.g. Windows or Linux). An example of an operation of the client flash virtualization module 420 and the components 425, 430, 435, and 440 thereof is provided in conjunction with FIGS. 8A-8H.

As illustrated, the memory 415 of the client computing device 110A also includes a flash player 210A. The flash player 210A is configured to play flash content received at the client computing device 110A, for example, via the tunnel 230A, via the connection 135A to the network 140A, or via the connection 145A to the proxy server 130A. The flash player 210A may be, for example, Adobe Flash Player® or any other flash player.

Example of Computing Device

Figure 5:
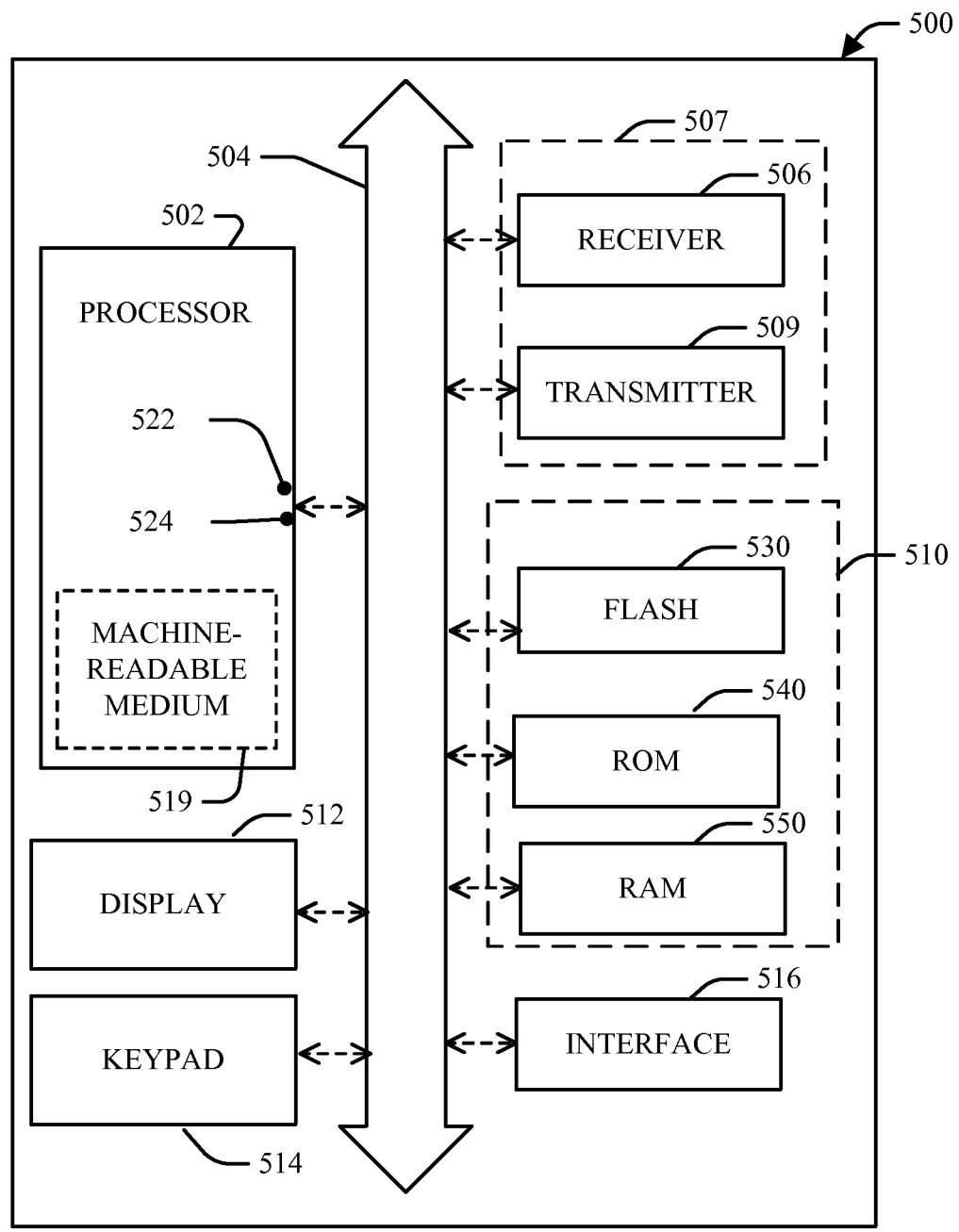
FIG. 5 is a conceptual block diagram illustrating an example of a computing device.

FIG. 5 is a conceptual block diagram illustrating an example of a computing device.

A computing device 500 may be, for example, a client computing device 110A, a server 120A, a proxy server 130A, or a flash content server 150A. A computing device may comprise one or more computing devices.

A computing device 500 may include a processor 502. The processor 502 may include one or more processors. The processor 502 is capable of communication with a receiver 506 and a transmitter 508 through a bus 504 or other structures or devices. It should be understood that communication means other than busses may be utilized with the disclosed configurations. The processor 502 may generate commands, messages, and/or other types of data to be provided to the transmitter 509 for communication. In addition, commands, messages, and/or other types of data may be received at the receiver 506, and processed by the processor 502.

The processor 502 may operate in conjunction with a general-purpose processor or a specific-purpose processor for executing instructions and may further include a machine-readable medium 519 for storing data and/or instructions for software programs. The instructions, which may be stored in a machine-readable medium 510 and/or 519, are executable by the processor 502 to control and manage access to the various networks, as well as provide other communication and processing functions. The instructions may also include instructions executable by the processor 502 for various user interface devices, such as a display 512 and a keypad 514. The processor 502 may include an input port 522 and an output port 524. Each of the input port 522 and the output port 524 may include one or more ports. The input port 522 and the output port 524 may be the same port (e.g., a bi-directional port) or may be different ports.

The processor 502 may be implemented using software, hardware, or a combination of both. By way of example, the processor 502 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, and/or any other suitable device that may perform calculations or other manipulations of information. Those skilled in the art will recognize how best to implement the described functionality for the processor 502.

Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code). Instructions may be executable, for example, by a computing device (e.g., a client computing device, an HTTP server, a web server) or by a processing system (e.g., an operating system, an HTTP server, or a web server). Instructions may be, for example, a computer program including code.

A machine-readable medium may be one or more machine-readable media. A machine-readable medium (e.g., 510) may include storage external to an operating system, such as a random access memory (RAM) 550, a flash memory 530, a read only memory (ROM) 540, a programmable read-only memory (PROM), an erasable PROM (EPROM), registers, a hard disk, a removable disk, a CD-ROM, a DVD, or any other suitable storage device. A machine-readable medium 519 may also have a volatile memory and a non-volatile memory. The machine-readable medium 519 may be a non-transitory machine-readable medium. A non-transitory machine-readable medium may include one or more volatile and/or non-volatile memories. A machine-readable medium 519 may include storage integrated into a processing system, such as might be the case with an application specific integrated circuit (ASIC). A memory may be a machine-readable medium (e.g., 510 or 519) or a part thereof.

According to one aspect of the disclosure, a machine-readable medium is a computer-readable medium encoded or stored with instructions and is a computing element, which defines structural and functional interrelationships between the instructions and the rest of the computing device, which permit the instructions' functionality to be realized. In one aspect, a machine-readable medium is a non-transitory machine-readable medium, a machine-readable storage medium, or a non-transitory machine-readable storage medium. In one aspect, a non-transitory machine-readable medium is a computer-readable medium, a non-transitory computer-readable medium, a computer-readable storage medium, or a non-transitory computer-readable storage medium.

An interface 516 may be any type of interface and may reside between any of the components shown in FIG. 5. An interface 516 may also be, for example, an interface to the outside world (e.g., an Internet network interface). A transceiver block 507 may represent one or more transceivers, and each transceiver may include a receiver 506 and a transmitter 509. A functionality implemented in a processor 502 may be implemented in a portion of a receiver 506, a portion of a transmitter 509, a portion of a machine-readable medium 510, a portion of a display 512, a portion of a keypad 514, or a portion of an interface 516, and vice versa. In one aspect, a computing device may include only some or all of the elements shown in FIG. 5. A computing device may include other elements not shown in FIG. 5. A computing device may include more than one of the same elements.

Example of Network System

Figure 6:
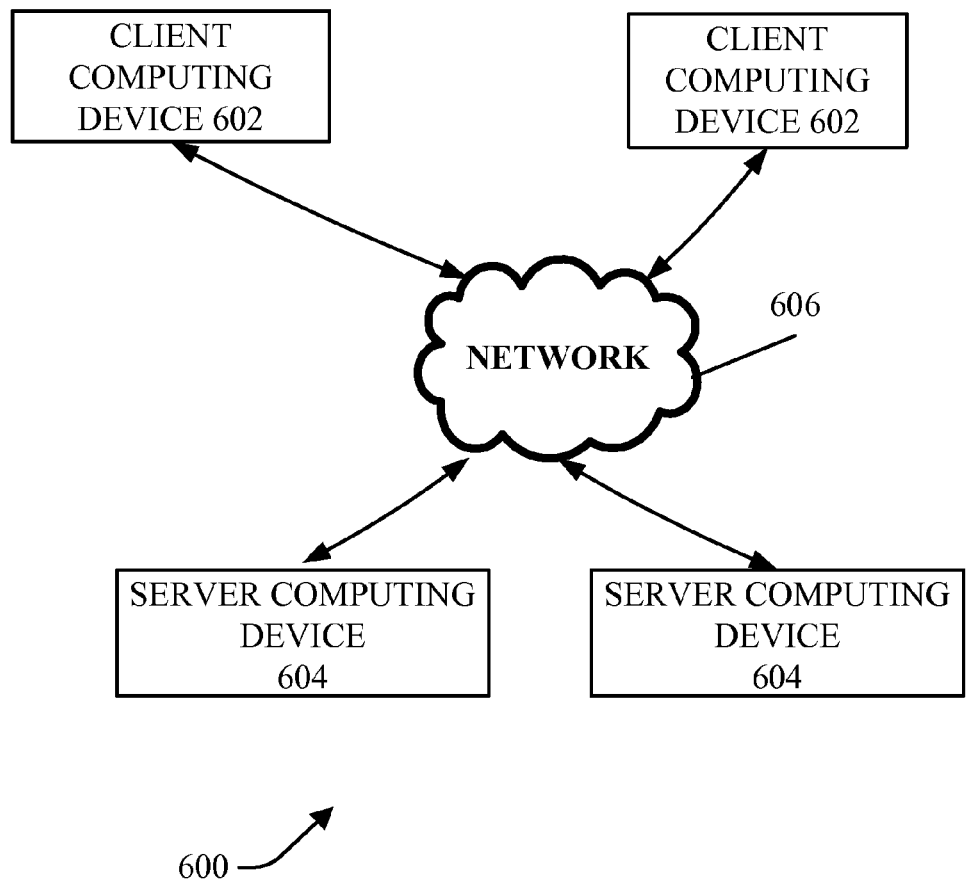
FIG. 6 illustrates a simplified diagram of an example of a network system.

FIG. 6 illustrates a simplified diagram of an example of a computer network system in accordance with an aspect of the present disclosure.

A computer network system 600 may include one or more client computing devices 602 (e.g., laptop computers, desktop computers, tablets, PDAs, mobile phones, etc.) in communication with one or more server computing devices 604 (e.g., a server such as an HTTP server, a web server, an enterprise server, etc.) via a network 606. In one aspect, a server computing device 604 is configured to allow remote sessions (e.g., remote desktop sessions) wherein users may access applications and files on the server computing device 604 by logging onto the server computing device 604 from a client computing device 602. Such a connection may be established using any of several well-known techniques such as the remote desktop protocol (RDP) on a Windows-based server or the techniques disclosed herein for a non-Windows-based server.

In one aspect, a client computing device 602 may be an end-user computing device, such as a laptop or desktop computer. The client computing device 602 may correspond to the client computing device 110A of FIG. 1A. In one aspect, a server computing device 604 may correspond to one or more of the server 120A, the proxy server 130A, or the flash content server 150A of FIG. 1A.

By way of illustration and not limitation, a client computing device 602 may represent a computer, a mobile phone, a laptop computer, a tablet, a thin computing device, a personal digital assistant (PDA), a portable computing device, a virtual machine, or a suitable device with a processor. In one example, a client computing device 602 is a smart phone (e.g., iPhone, Android phone, Blackberry, etc.). In certain configurations, a client computing device 602 may represent an audio player, a game console, a camera, a camcorder, an audio device, a video device, a multimedia device, or a device capable of supporting a connection to a remote computing device. In an example, a client computing device 602 is mobile. In another example, a client computing device 602 is a hand-held device. In another example, a client computing device 602 may be stationary. In one example, a client computing device 602 may be a device having at least a processor and memory, where the total amount of memory of the client computing device 602 is less than the total amount of memory in a server computing device 604. In an example, a client computing device 602 does not have a hard disk. In one example, a client computing device 602 has a display smaller than a display supported by a server computing device 604.

In one aspect, a server computing device 604 may represent a computer, a laptop computer, a computing device, a virtual machine (e.g., VMware® Virtual Machine), a desktop session (e.g., Microsoft Terminal Server), a published application (e.g., Microsoft Terminal Server) or a suitable device with a processor. In one aspect, a server computing device 604 may be stationary. In another aspect, a server computing device 604 may be mobile. In certain configurations, a server computing device 604 may be any device that may represent a computing device. In one aspect, a server computing device 604 may include one or more computing devices.

In one example, a first device is remote to a second device when the first device is not directly connected to the second device. In one example, a first remote device may be connected to a second device over a communication network such as a Local Area Network (LAN), a Wide Area Network (WAN), and/or other network.

When a client computing device 602 and a server computing device 604 are remote with respect to each other, a client computing device 602 may connect to a server computing device 604 over a network 606, for example, via a modem connection, a LAN connection including the Ethernet or a broadband WAN connection including DSL, Cable, T1, T3, Fiber Optics, Wi-Fi, or a mobile network connection including GSM, GPRS, 3G, WiMax or other network connection. A network 606 may be a LAN network, a WAN network, a wireless network, the Internet, an intranet or other network. A remote device (e.g., a computing device) on a network may be addressed by a corresponding network address, such as, but not limited to, an Internet protocol (IP) address, an Internet name, a Windows Internet name service (WINS) name, a domain name or other system name. These illustrate some examples as to how one device may be remote to another device. However, the present disclosure is not limited to these examples.

Example Virtualization System

Figure 7:
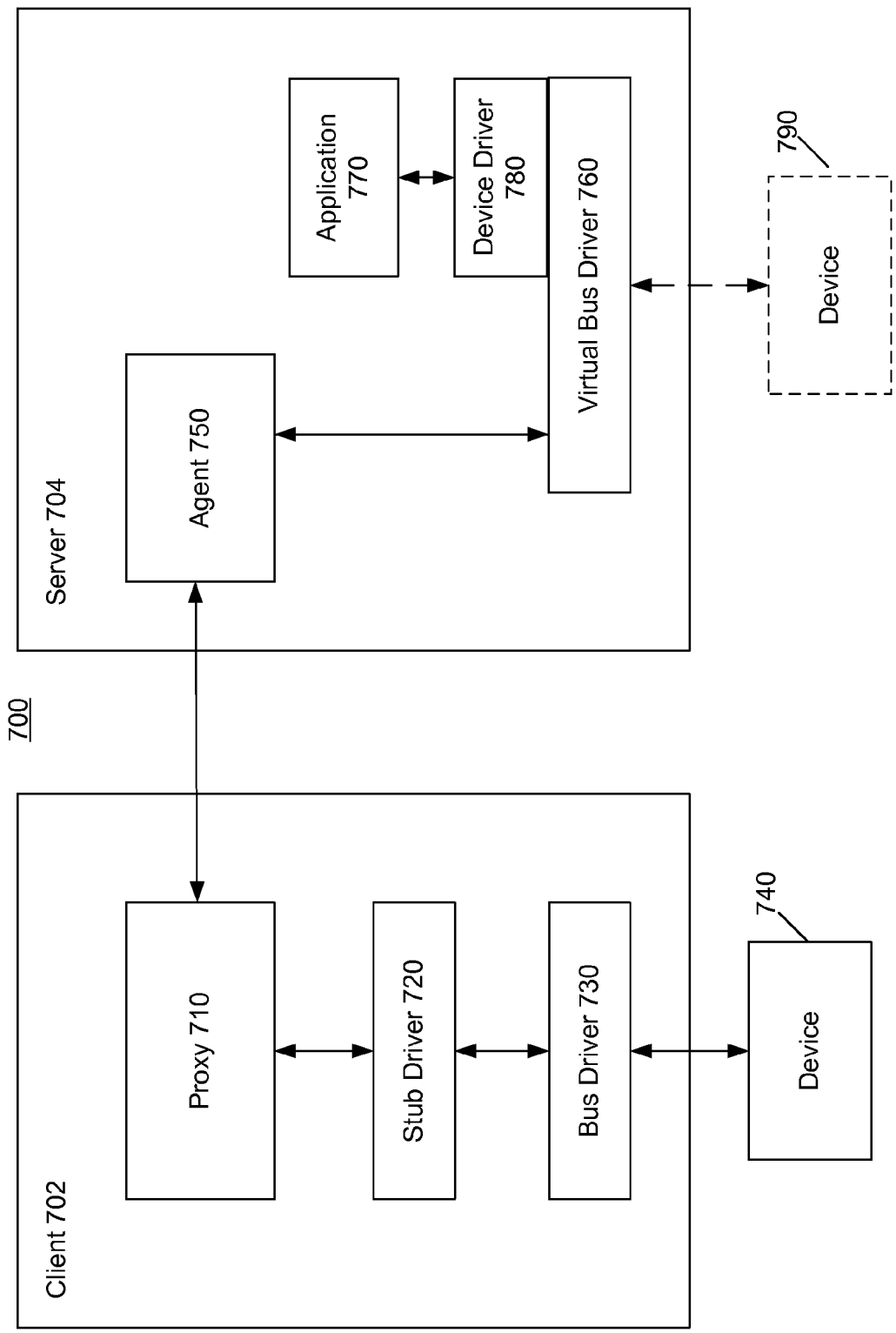
FIG. 7 is a conceptual block diagram of a local device virtualization system.

FIG. 7 is a block diagram of a local device virtualization system 700, according to an aspect of the disclosure. The system 700 may include the client 702 in communication with the server 704, for example, over a network (as illustrated in detail in FIG. 6). The client 702 may include a proxy 710, a stub driver 720, and a bus driver 730. The client 702 may be connected to a device 740, as shown in FIG. 7. The server 704 may include an agent 750, and a virtual bus driver 760.

According to the illustrated configuration, while the device 740 is not locally or physically connected to the server 704 and is remote to the server 704, the device 740 appears to the server 704 as if it is locally connected to the server 704, as discussed further below. Thus, the device 740 appears to the server 704 as a virtual device 790.

By way of illustration and not limitation, the device 740 may be a machine-readable storage medium (e.g., flash storage device), a printer, a scanner, a camera, a facsimile machine, a phone, an audio device, a video device, a peripheral device, or other suitable device that may be connected to the client 702. The device 740 may be an external device (i.e., external to the client 702) or an internal device (i.e., internal to the client 702).

In one aspect of the disclosure, the device 740 is a Universal Serial Bus (USB) device that may be locally connected to the client 702 using a wired USB or wireless USB connection and communicates with the client 702 according to a USB communications protocol. In another aspect, the device 740 may be a device other than a USB device.

As used herein, a "local" device of a system, or a device "locally" connected to a system, may be a device directly connected to the system using one or more wires or connectors (e.g., physically connected to the system), or a device directly connected to the system using a wireless link (e.g., Bluetooth). For example, device 740 is a local device of client 702. Furthermore, in one aspect of the disclosure, a local device of a system or a device locally connected to a system may include a device within the system (e.g., an internal device of client 702).

A "remote" device, or a device "remote" to a system, may be a device that is not directly connected to the system. For example, the server 704 is remote to both client 702 and device 740 because server 704 is not directly connected to client 702 or device 740 but connected indirectly through network 606 (illustrated in FIG. 6), which may include, for example, another server, or the Internet.

The bus driver 730 may be configured to allow the operating system and programs of the client 702 to interact with the device 740. In one aspect, when the device 740 is connected to the client 702 (e.g., plugged into a port of the client 702), the bus driver 730 may detect the presence of the device 740 and read information regarding the device 740 ("device information") from the device 740. The device information may include features, characteristics and other information specific to the device. For an example of a USB device, the device information may comprise a device descriptor (e.g., product ID, vender ID and/or other information), a configuration descriptor, an interface descriptor, an endpoint descriptor and/or a string descriptor. The bus driver 730 may communicate with the device 740 through a computer bus or other wired or wireless communications interface.

In one aspect, a program (e.g., application) running locally on the client 702 may access the device 740. For example, the device 740 may be accessed locally when the client 702 is not connected to the server 704. In this aspect, the operating system (e.g., Microsoft Windows®) of the client 702 may use the device information to find and load an appropriate device driver (not shown) for the device 740. The device driver may provide the program with a high-level interface to the device 740.

In one aspect, the device 740 may be accessed from the server 704 as if the device were connected locally to the server 740. For example, the device 740 may be accessible from the desktop running on the server 704 (i.e., virtual desktop environment). In this aspect, the bus driver 730 may be configured to load the stub driver 720 as the default driver for the device 740. The stub driver 720 may be configured to report the presence of the device 740 to the proxy 710 and to provide the device information (e.g., device descriptor) to the proxy 710.

The proxy 710 may be configured to report the presence of the device 740, along with the device information, to the agent 750 of the server 704 over the network 606 (illustrated in FIG. 6). Thus, the stub driver 720 redirects the device 740 to the server 704 via the proxy 710.

The agent 750 may be configured to receive the report from the proxy 710 that the device 740 is connected to the client 702 and the device information. The agent 750 may provide notification of the device 740, along with the device information, to the virtual bus driver 760. The virtual bus driver 760 may be configured to report to the operating system of the server 704 that the device 740 is connected and to provide the device information to the operating system. This allows the operating system of the server 704 to recognize the presence of the device 740 even though the device 740 is connected to the client 702. The operating system of the server 704 may use the device information to find and load an appropriate device driver 780 for the device 740 at the server 704, an example of which is illustrated in FIG. 7. As a result, the device 740 is enumerated on the server 704. Once the presence of the device 740 is reported to the operating system of the server 704, the device 740 may be accessible from the desktop running on the server 704 (i.e., virtual desktop environment). For example, the device 740 may appear as an icon on the virtual desktop environment and/or may be accessed by applications running on the server 704.

In one aspect, an application 770 running on the server 704 may access the device 740 by sending a transaction request for the device 740 to the virtual bus driver 760 either directly or through the device driver 780. The virtual bus driver 760 may direct the transaction request to the agent 750, which sends the transaction request to the proxy 710 over the network 606. The proxy 710 receives the transaction request from the agent 750, and directs the received transaction request to the stub driver 720. The stub driver 720 then directs the transaction request to the device 740 through the bus driver 730.

The bus driver 730 receives the result of the transaction request from the device 740 and sends the result of the transaction request to the stub driver 720. The stub driver 720 directs the result of the transaction request to the proxy 710, which sends the result of the transaction request to the agent 750 over the network 606. The agent 750 directs the result of the transaction request to the virtual bus driver 760. The virtual bus driver 760 then directs the result of the transaction request to the application 770 either directly or through the device driver 780.

Thus, the virtual bus driver 760 may receive transaction requests for the device 740 from the application 770 and send results of the transaction requests back to the application 770 (either directly or through the device driver 780). As such, the application 770 may interact with the virtual bus driver 760 in the same way as a bus driver for a device that is connected locally to the server 704. The virtual bus driver 760 may hide the fact that it sends transaction requests to the agent 750 and receives the results of the transaction requests from the agent 750 instead of a device that is connected locally to the server 704. As a result, the device 740 connected to the client 702 may appear to the application 770 as if the physical device 740 is connected locally to the server 704.

In one example, the client 702 corresponds to the client computing device 110A, and the server 704 corresponds to the server 120A. The device 740 corresponds to a device (e.g., a mouse or a keyboard) of the client computing device 110A, which is virtualized on the server 120A as the virtual device 790. The connection between the client 702 and the server 704 may correspond to the connection 125A (e.g., a remote desktop protocol connection).

Example of an Operation of the Server for Presenting Flash Content

FIGS. 8A-8H are a flow chart illustrating an example process 800 of an operation of the server for presenting flash content.

Figure 8A:
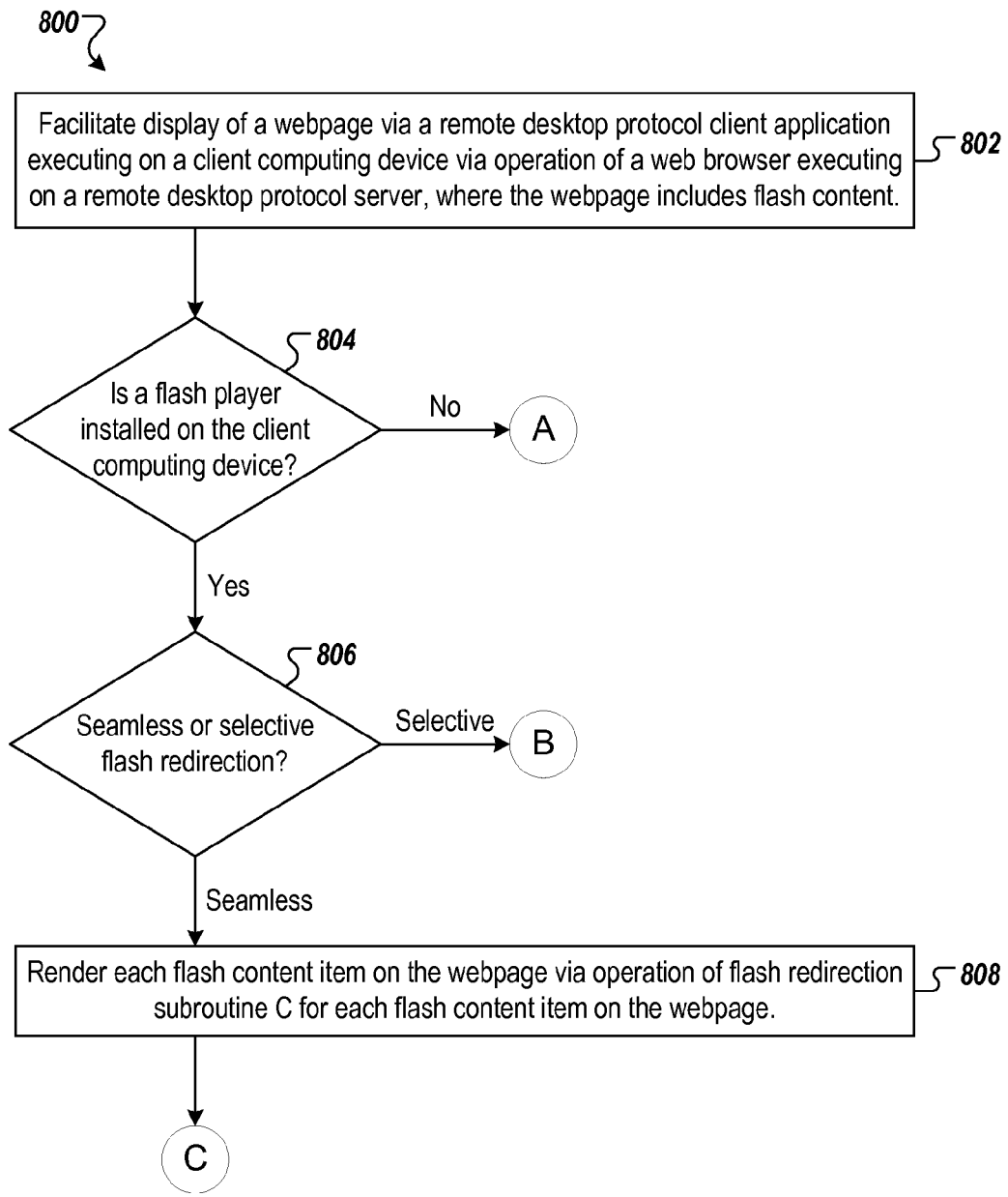
FIGS. 8A-8H are a flow chart illustrating an example of an operation of the server.

With reference to FIG. 8A, the process 800 begins at operation 802, where a remote desktop protocol server (e.g., server 120A) facilitates display of a webpage. The webpage may be displayed by operation of a browser (e.g., browser 350) executing on the remote desktop protocol server. The webpage may be displayed via a remote desktop protocol client application executing on a client computing device (e.g., client computing device 110A). The client computing device may receive, from the remote desktop protocol server, a bitmap that includes image data associated with the webpage via the remote desktop protocol connection. The client computing device may provide for display of the bitmap, for example, via a display unit (e.g., a screen) of the client computing device. The webpage may include flash content (e.g., a single flash content item or multiple flash content items). The flash content item(s) may include one or more flash video(s) and/or one or more transparent flash content item(s), and the flash content items may interact with scripts including, for example, JavaScript or ActionScript, and may, for example, interact with NPN calls. The remote desktop protocol server and the client computing device may be connected via a remote desktop protocol connection (e.g., connection 125A). The remote desktop protocol may be, for example, Microsoft Remote Desktop Protocol® (RDP), Citrix Independent Computing Architecture® (ICA), or VMware VMview®.

In operation 804, the remote desktop protocol server (e.g., server 120A) may determine whether a flash player (e.g., Adobe Flash Player®) is installed on the client computing device. The remote desktop protocol server (e.g., server 120A) may determine whether the flash player is installed on the client computing device, for example, by sending a message to the client computing device via operation of a prerequisite check module (e.g., prerequisite check module 325) in conjunction with a network module (e.g., network module 345). If the flash player is not installed on the client computing device, the process 800 continues to flash acceleration Subroutine A, which begins at operation 810 and is described in detail below. If the flash player is installed on the client computing device, the process 800 continues to operation 806.

In operation 806, the remote desktop protocol server determines whether seamless or selective flash redirection settings are in effect. The remote desktop protocol server may determine whether seamless or selective flash redirection settings are in effect via operation of the prerequisite check module (e.g., prerequisite check module 325). In one example, the remote desktop protocol server may determine whether seamless or selective flash redirection settings are in effect based on the settings stored on the server (e.g., settings 360, which include seamless/selective flash redirection settings 365). The settings stored on the server may be entered by an administrator of the server and may be modified by the administrator. If selective flash redirection settings are in effect, the process 800 continues to Selective Flash Redirection Subroutine B, which begins at operation 824 and is described in detail below. If seamless flash redirection settings are in effect, the process 800 continues to operation 808.

In operation 808, the remote desktop protocol server renders each flash content item on the webpage via operation of Flash Redirection Subroutine C for each flash content item of the webpage. Flash Redirection Subroutine C begins at operation 832 and is described in detail below.

Flash Acceleration Subroutine A

Figure 8B:
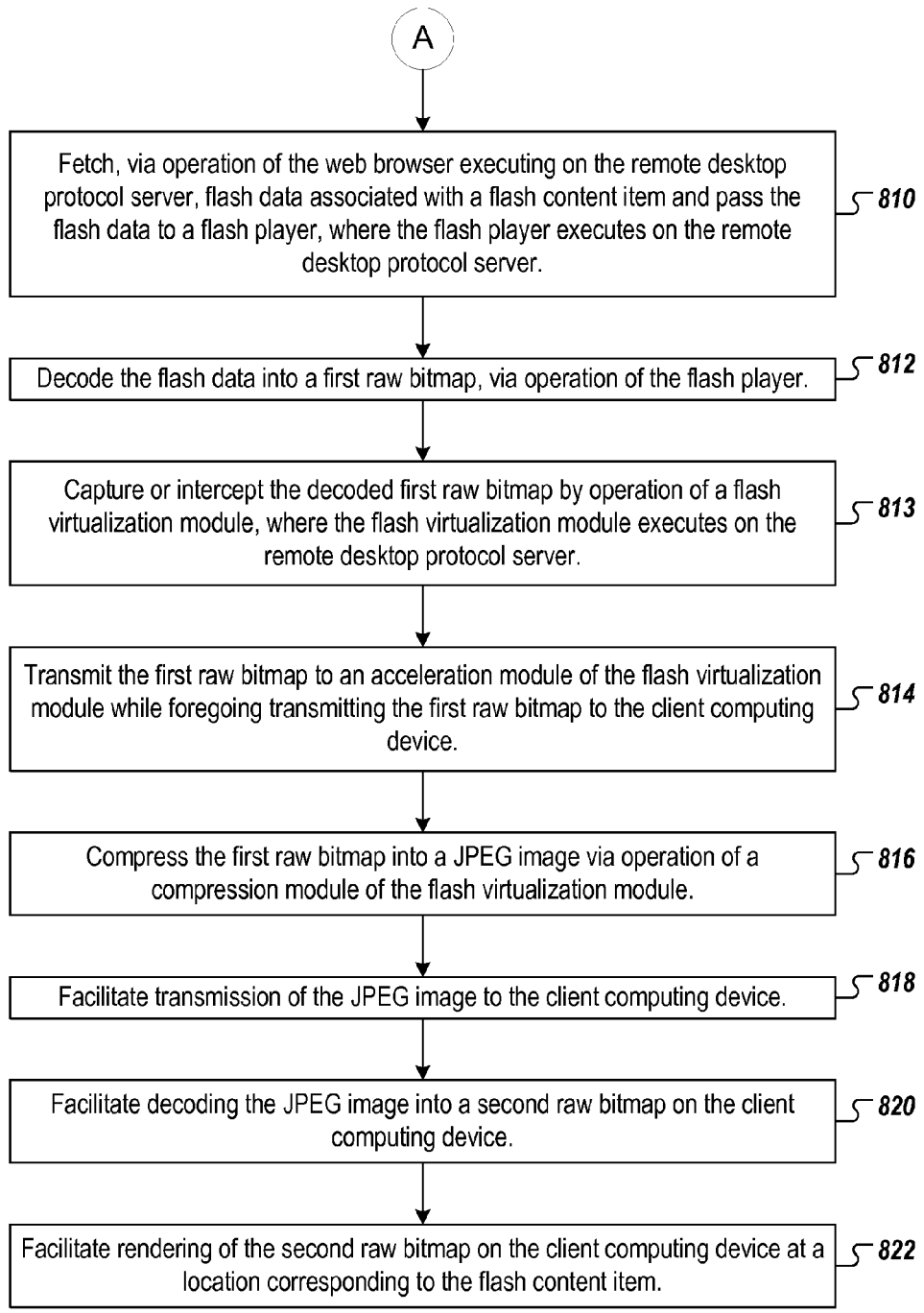

With reference to FIG. 8B, the flash acceleration Subroutine A begins at operation 810, where the remote desktop protocol server fetches, via operation of the web browser (e.g., browser 350), flash data associated with a flash content item and passes the flash data to a flash player (e.g., flash player 355, which may correspond to Adobe Flash Player®). The flash player executes within the remote desktop protocol server. The flash data may include, for example, a video file.

In operation 812, the remote desktop protocol server decodes the flash data into a first raw bitmap, via operation of the flash player (e.g., flash player 355).

In operation 813, the remote desktop protocol server captures or intercepts the decoded first raw bitmap by operation of a flash virtualization module (e.g., server flash virtualization module 320). The flash virtualization module executes within the remote desktop protocol server.

In operation 814, the remote desktop protocol server transmits the first raw bitmap to an acceleration module (e.g., acceleration module 335) of the flash virtualization module, while foregoing transmission of the first raw bitmap to the client computing device.

In operation 816, the remote desktop protocol server compresses the first raw bitmap into an image, for example, a JPEG image. The compression may be completed via operation of a compression module (e.g., compression module 330) of the flash virtualization module. In some examples, a different image file type, e.g., a GIF image, may be used in place of the JPEG image.

In operation 818, the remote desktop protocol server facilitates transmission of the image (e.g., the JPEG image) to the client computing device, for example, via operation of a redirection module (e.g., redirection module 340) or a network module (e.g., network module 345). The image may be received on the client computing device via operation of a network module (e.g., network module 430) residing within a client flash virtualization module (e.g., client flash virtualization module 420) of the client computing device.

In operation 820, the remote desktop protocol server facilitates decoding the image into a second raw bitmap on the client computing device. The decoding may be completed via a decoding module (e.g., decoding module 425) residing within the client flash virtualization module (e.g., client flash virtualization module 420) of the client computing device.

In operation 822, the remote desktop protocol server facilitates rendering of the second raw bitmap on the client computing device at a location (e.g., on a display of the client computing device) corresponding to the flash content item. The rendering may be completed via a rendering module (e.g., rendering module 440) residing within the client flash virtualization module (e.g., client flash virtualization module 420) of the client computing device. After operation 822, the process 800 ends.

Figure 9A:
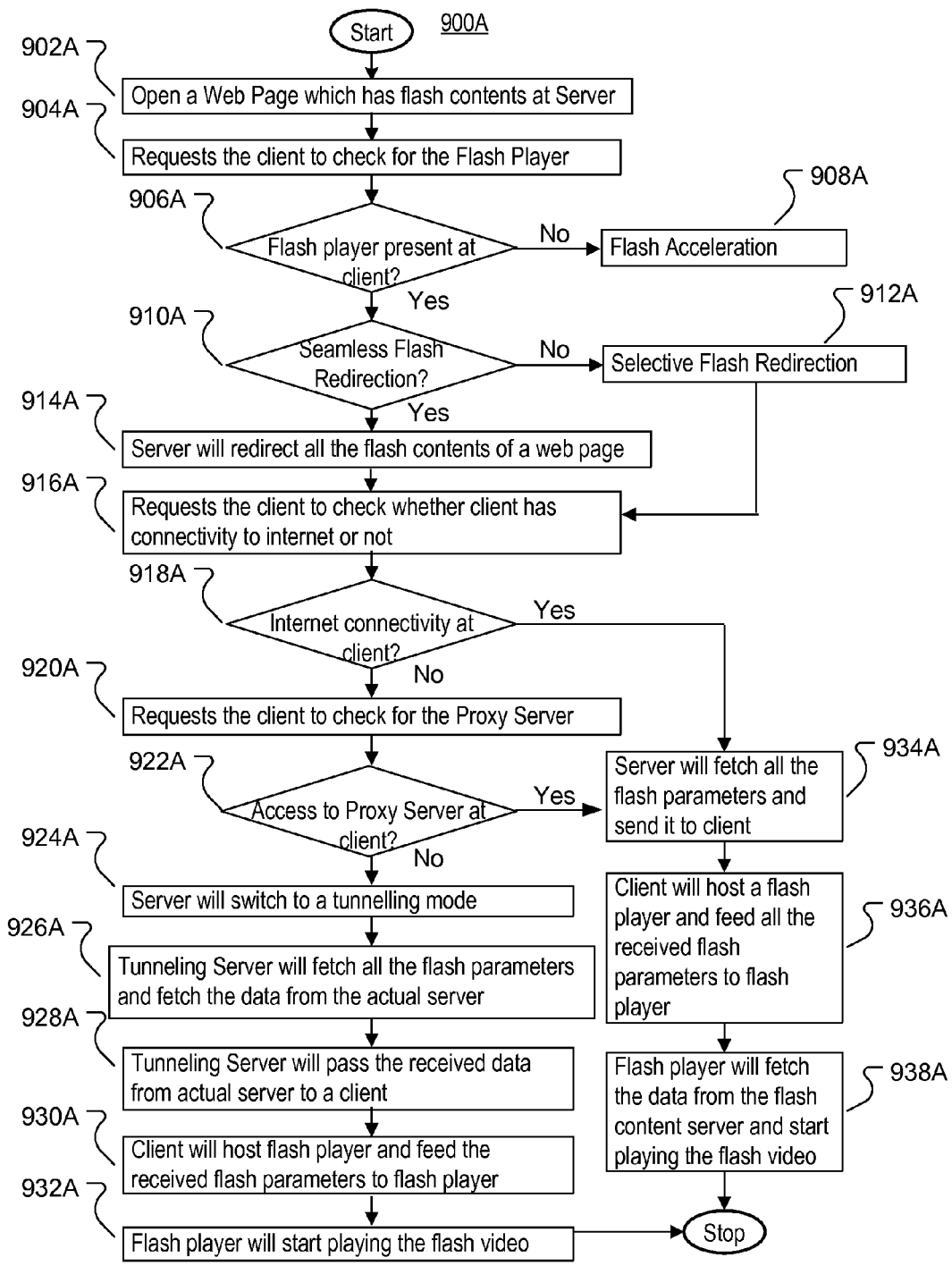
FIGS. 9A-9C are flow charts illustrating examples of operations of the server.
Figure 9B:
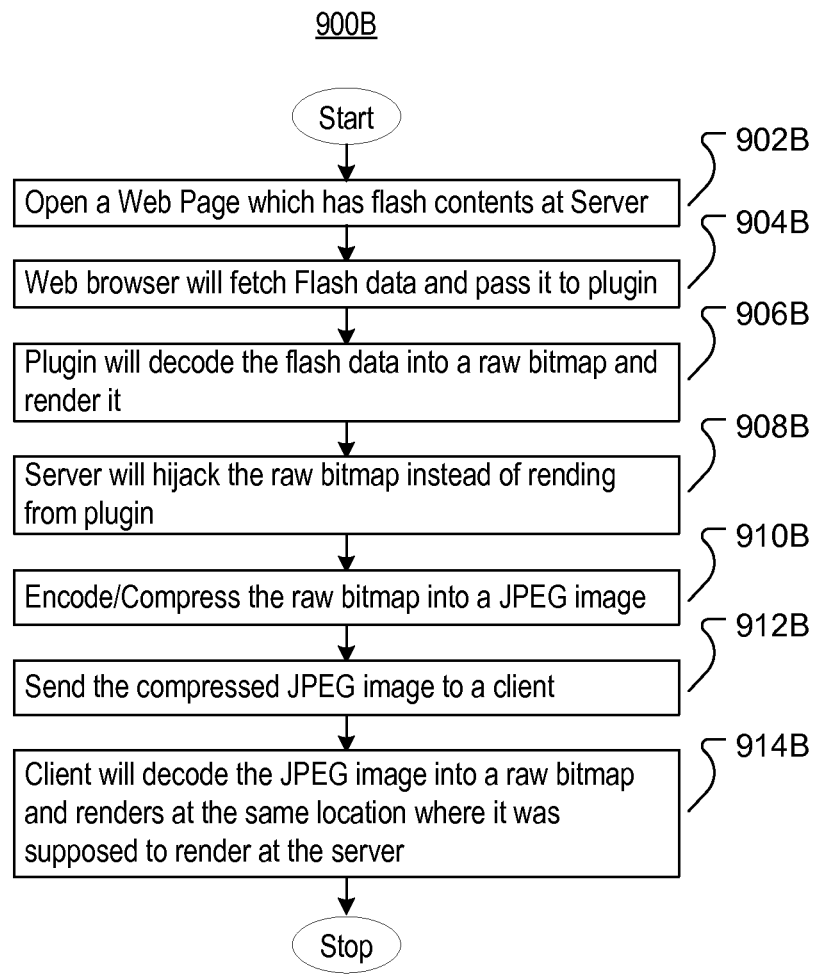

One example of a process of flash acceleration 900B is illustrated in FIG. 9B and includes the steps 902B, 904B, 906B, 908B, 910B, 912B, and 914B.

Selective Flash Redirection Subroutine B

Figure 8C:
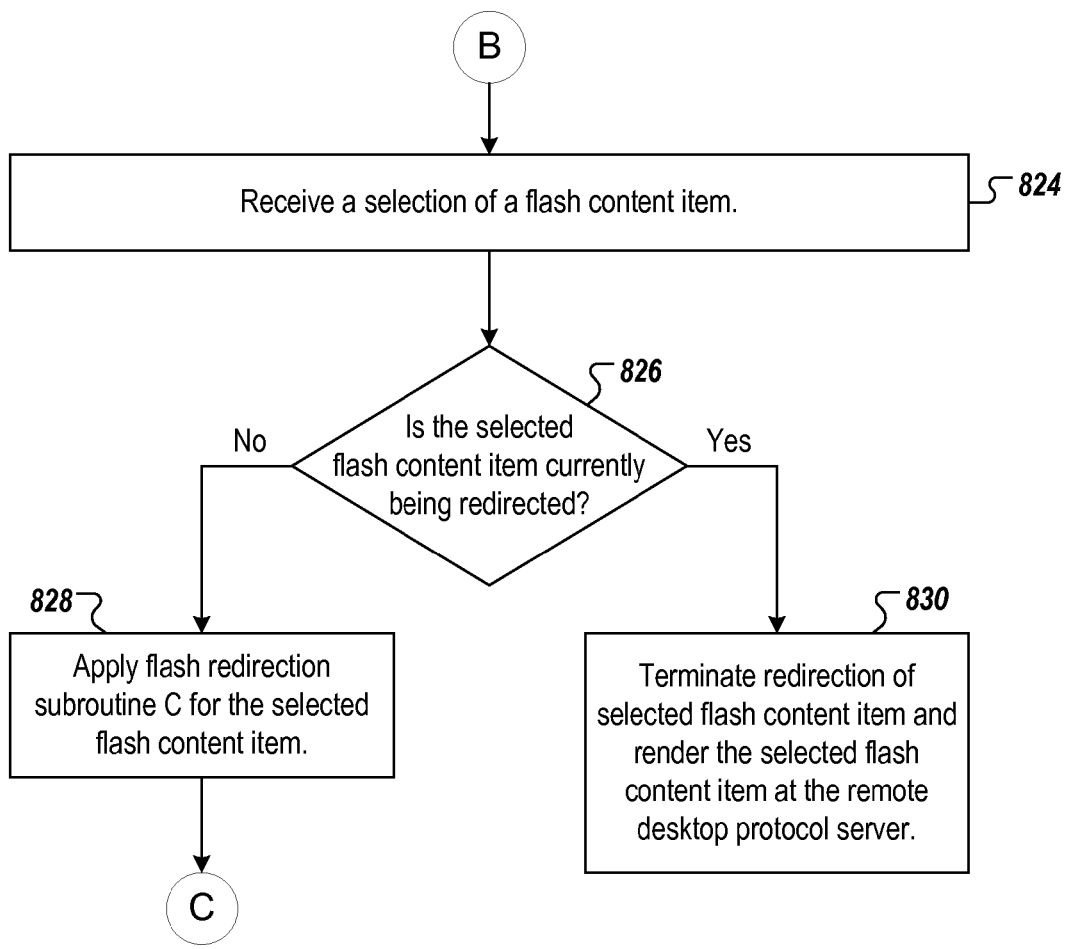

With reference to FIG. 8C, the selective Flash Redirection Subroutine B begins at operation 824, where the remote desktop protocol server receives a selection of a flash content item. The selection may be entered via the web browser (e.g., browser 350) of the server executing in a remote desktop protocol client application on the client computing device. For example, the user of the client computing device may select a flash content item (e.g., by clicking on the flash content item using a mouse or touching the flash content item on a touch screen).

In operation 826, the remote desktop protocol server determines whether the selected flash content item is currently being redirected. The remote desktop protocol may make this determination based on a stored state of one or more of the web browser, the flash virtualization module (e.g., server flash virtualization module 320), the redirection module (e.g., redirection module 340) within the flash virtualization module, or the network module (e.g., network module 345) within the flash virtualization module. Initially, all flash content item(s) on the webpage may not be redirected (may have a state indicating that the flash content item(s) are not redirected). Alternatively, initially all flash content item(s) on the webpage may be redirected (may have a state indicating that the flash content item(s) are redirected). Upon selection of a flash content item, the redirection state of the flash content item may be changed—if the flash content item is presently not redirected, the flash content item may change to being redirected; if the flash content item is presently being redirected, the flash content item may change to not being redirected. If the selected flash content item is not currently being redirected, the process 800 continues to operation 828. If the selected flash content item is currently being redirected, the process 800 continues to operation 830.

In operation 828, if the selected flash content item is not currently being redirected, the remote desktop protocol server applies Flash Redirection Subroutine C for the selected flash content item. Flash Redirection Subroutine C begins at operation 832 and is described in detail below.

In operation 830, if the selected flash content item is currently being redirected, the remote desktop protocol server terminates redirection of the selected flash content item and renders the selected flash content item at the remote desktop protocol server. The rendered raw bitmap, including the selected flash content item, is then transmitted to the client computing device via the remote desktop protocol. The rendered raw bitmap may then be provided for display on the client computing device. After operation 830, the process 800 ends.

Figure 9C:
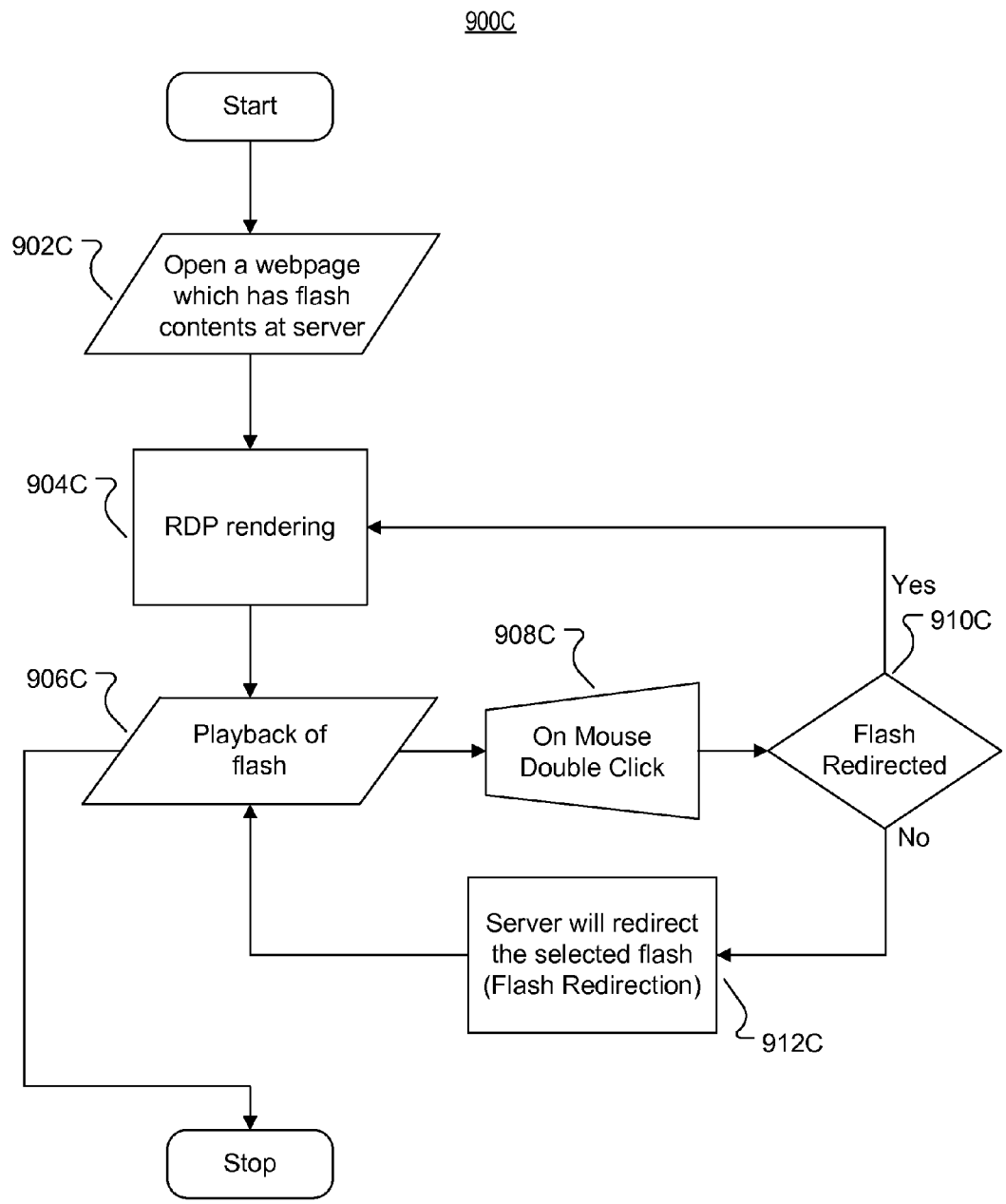

One example of a process of selective flash redirection 900C is illustrated in FIG. 9C and includes the steps 902C, 904C, 906C, 908C, 910C, and 912C.

With selective flash redirection, a user may be able to select which flash content item(s) are redirected for rendering at the client computing device and which flash content item(s) are rendered on the remote desktop protocol server. As a result, use of the memory, the rendering processors (e.g., processors in the central processing unit or the graphics processing unit), or the network interface of the client computing device may be reduced. In some aspects, flash content item(s) on a webpage in which the user has an interest (e.g., which the user selects) may be rendered more quickly on the client computing device, while the flash content item(s) that are not selected may be rendered more slowly or more poorly via the remote desktop protocol connection.

Flash Redirection Subroutine C

Figure 8D:
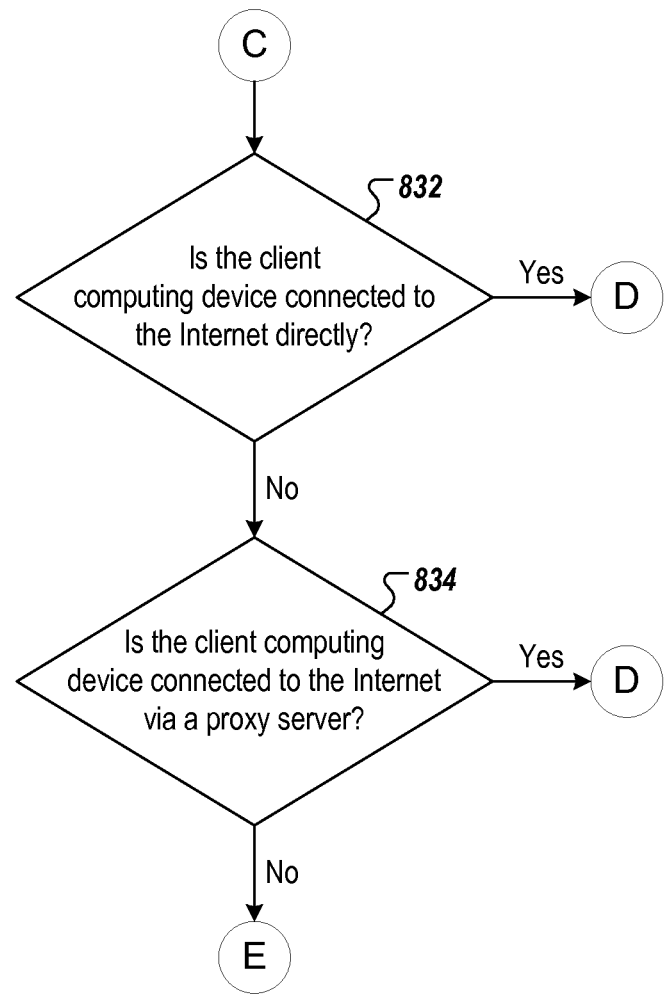

With reference to FIG. 8D, the flash redirection Subroutine C begins at operation 832, where the remote desktop protocol server determines whether the client computing device is connected to the Internet directly (e.g., via connection 135A). For example, the remote desktop protocol server may send a message to the client computing device inquiring whether the client computing device is connected to the Internet directly and receive a response from the client computing device (based on a determination made at the client computing device). If the client computing device is connected to the Internet directly, the process 800 continues to Internet-Based Flash Redirection Subroutine D, which begins at operation 836 and is described in detail below. If the client computing device is not connected to the Internet directly, the process 800 continues to operation 834.

In operation 834, the remote desktop server determines whether the client computing device is connected to the Internet via a proxy server (e.g., via Proxy Server 130A, via connections 145A and 155A). The proxy server may be different from the remote desktop protocol server. For example, the remote desktop protocol server may send a message to the client computing device inquiring whether the client computing device is connected to the Internet via the proxy server and receive a response from the client computing device. If the client computing device is connected to the Internet via the proxy server, the process 800 continues to Internet-Based Flash Redirection Subroutine D, which begins at operation 836 and is described in detail below. If the client computing device is not connected to the Internet (either directly or via the proxy server), the process 800 continues to Tunnel-Based Flash Redirection Subroutine E, which begins at operation 842 and is described in detail below.

Internet-Based Flash Redirection Subroutine D

Figure 8E:
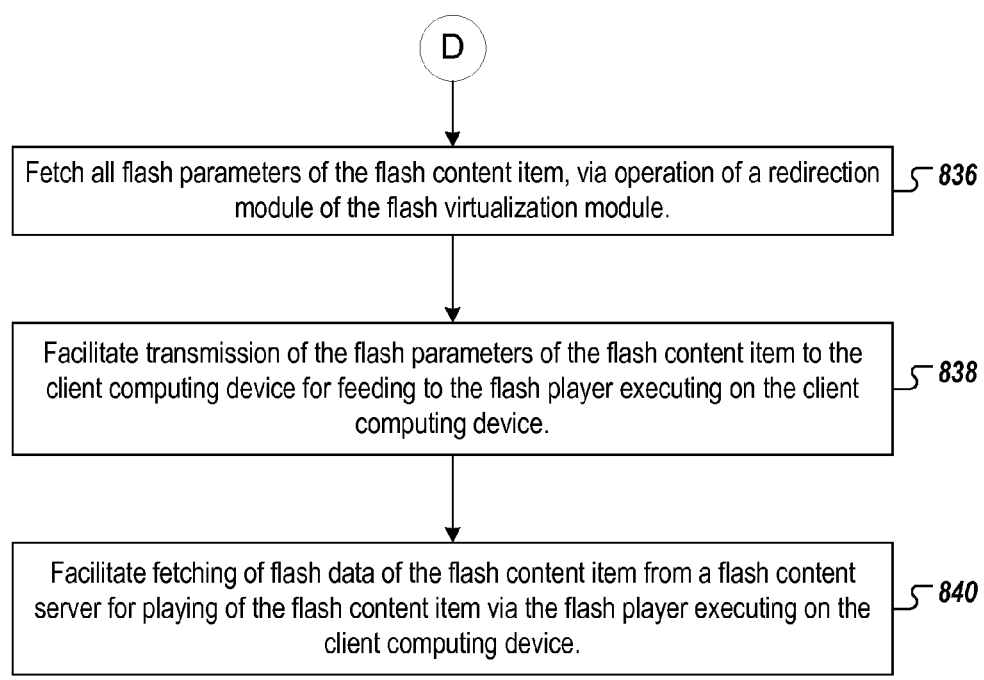

With reference to FIG. 8E, the Internet-Based Flash Redirection Subroutine D begins at operation 836, where the remote desktop protocol server fetches all flash parameters of the flash content item, via operation of a redirection module (e.g., redirection module 340) of the flash virtualization module (e.g., server flash virtualization module 320). The flash parameter(s) may include, for example, a uniform resource locator (URL) of the flash content item, a size of the flash content item, dimensions of the flash content item, etc. The flash parameters of the flash content item are flash parameters associated with the flash content item.

In operation 838, the remote desktop protocol server facilitates transmission of the flash parameters of the flash content item to the client computing device for feeding to the flash player (e.g., flash player 210A) executing on the client computing device. The flash parameters of the flash content item may include, for example, a uniform resource locator (URL) of the flash content item.

In operation 840, the remote desktop protocol server facilitates fetching of flash data of the flash content item from a flash content server for playing of the flash content item via the flash player executing on the client computing device. The client computing device may fetch the flash data of the flash content item via its Internet connection, which may be a direct Internet connection or an Internet connection via a proxy server. On the client computing device, the flash redirection client module (e.g. flash redirection client module 435) may instantiate the flash player (e.g., flash player 210A) in a position of a display overlaying the browser of the remote desktop protocol client application. After operation 840, the process 800 ends.

Tunnel-Based Flash Redirection Subroutine

Figure 8F:
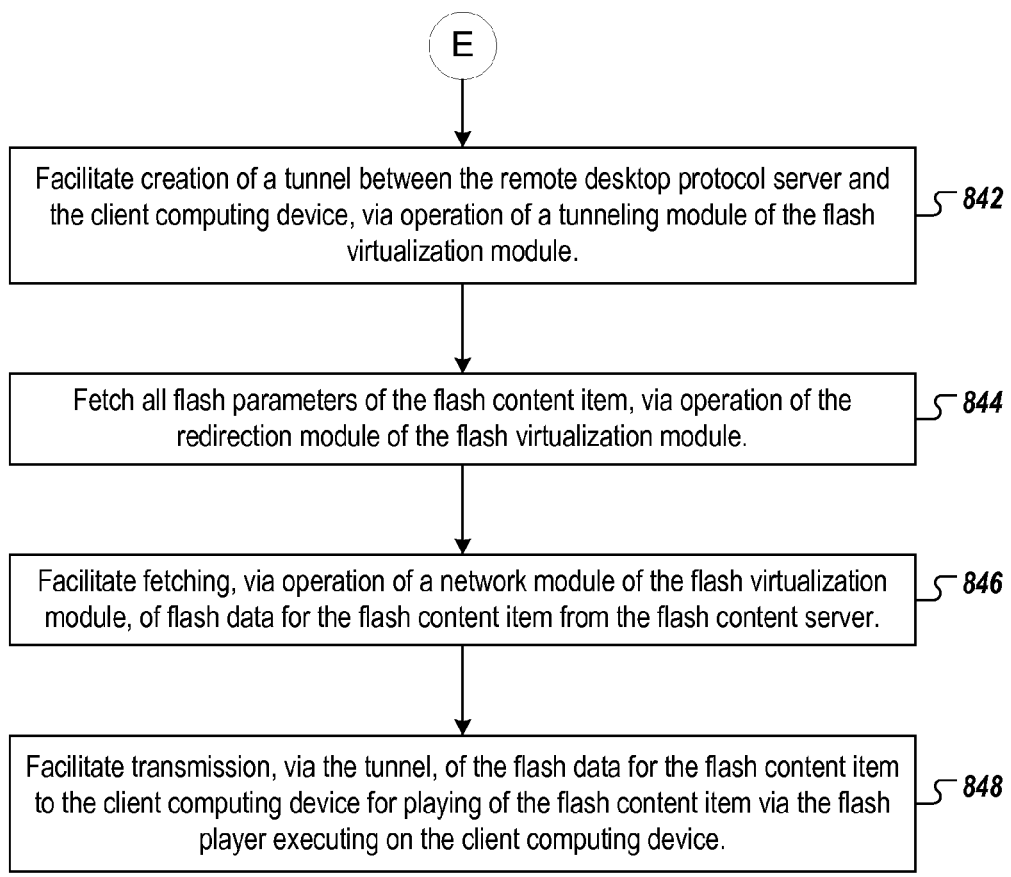

With reference to FIG. 8F, the Tunnel-Based Flash Redirection Subroutine E begins at operation 842, where the remote desktop protocol server facilitates creation of a tunnel (e.g., tunnel 230A) between the remote desktop protocol server and the client computing device, via operation of a tunneling module (e.g., Tunneling Module 220A) of the flash virtualization module (e.g., server flash virtualization module 320). Upon creation of the tunnel, the remote desktop protocol server may be connected to the client computing device via both the tunnel and the remote desktop protocol connection (e.g., connection 125A). The tunnel may be different from the remote desktop protocol connection.

In operation 844, the remote desktop protocol server fetches all flash parameters of the flash content item, via operation of the redirection module (e.g., redirection module 340) of the flash virtualization module.

In operation 846, the remote desktop protocol server facilitates fetching, via operation of the network module (e.g., Network Module 345) of the flash virtualization module, of flash data for the flash content item from the flash content server. The flash data may include, for example, a flash video.

In operation 848, the remote desktop protocol server facilitates transmission, via the tunnel, of the flash data for the flash content item to the client computing device for playing of the flash content item via the flash player (e.g., flash player 210A) executing on the client computing device. The client computing device may receive the flash data. On the client computing device, the flash redirection client module (e.g. flash redirection client module 435) may instantiate the flash player (e.g., flash player 210A) in a position of a display overlaying the browser of the remote desktop protocol client application. The position of the display may overlay the image data associated with the webpage. The flash player on the client computing device may play the flash data in response to receipt of the flash data. After operation 848, the process 800 ends.

Flash Redirection with Scripts

Figure 8G:
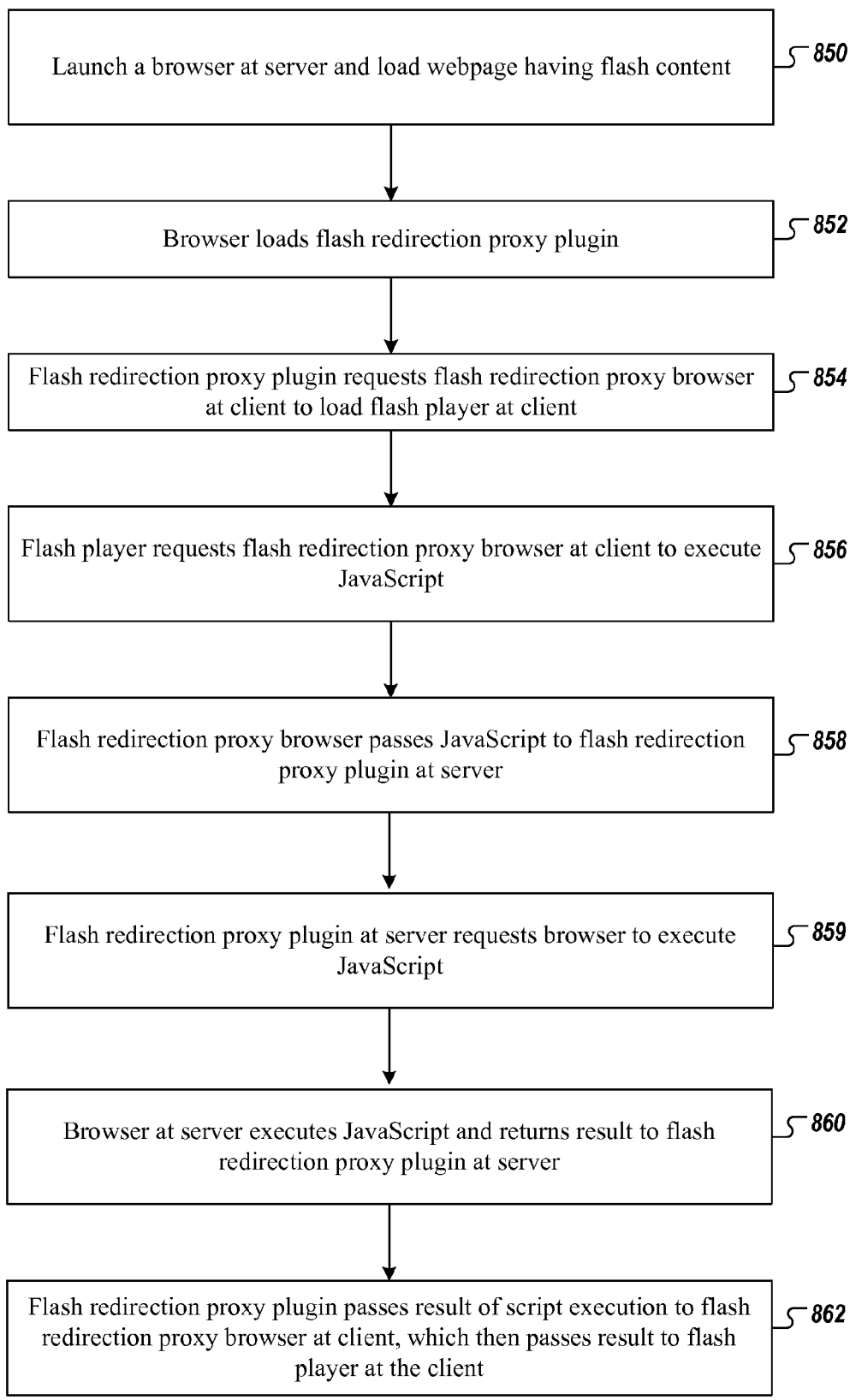

FIG. 8G illustrates the operation of flash redirection in conjunction with the remote execution of JavaScript. At step 850, a browser (e.g. browser 350) is launched at a server (e.g. server 120A), and the browser loads a webpage having flash content. The browser may be, for example, Internet Explorer (typically using ActiveX plugins for flash support), Firefox, Chrome, or another NPAPI browser (using NPAPI plugins for flash). When using flash redirection, the browser may, at step 852, load the flash redirection proxy plugin (e.g. part of redirection module 340). At step 854, the flash redirection proxy plugin may request the flash redirection proxy browser (e.g. part of flash redirection client module 435) to load flash player 210A at the client. In this example, the flash content of the webpage depends on the execution of JavaScript, and so at step 856, flash player 210A requests the flash redirection proxy browser at the client to execute the JavaScript. As the browser capable of executing the JavaScript is located at the server, at step 858, the flash redirection proxy browser passes the JavaScript to flash redirection proxy plugin so that it may be executed by browser 350. At step 859, the flash redirection proxy plugin requests browser 350 to execute the JavaScript. At step 860, the browser at the server executes the JavaScript and returns the result to the flash redirection proxy plugin at the server. At step 862, the flash redirection proxy plugin passes the result of the script execution to the flash redirection proxy browser, which then passes the result to the flash player at the client. The client, therefore, may experience playback of flash content that interacts with JavaScript, with the flash content rendered locally at the client, and the JavaScript executed remotely at a server.

Figure 8H:
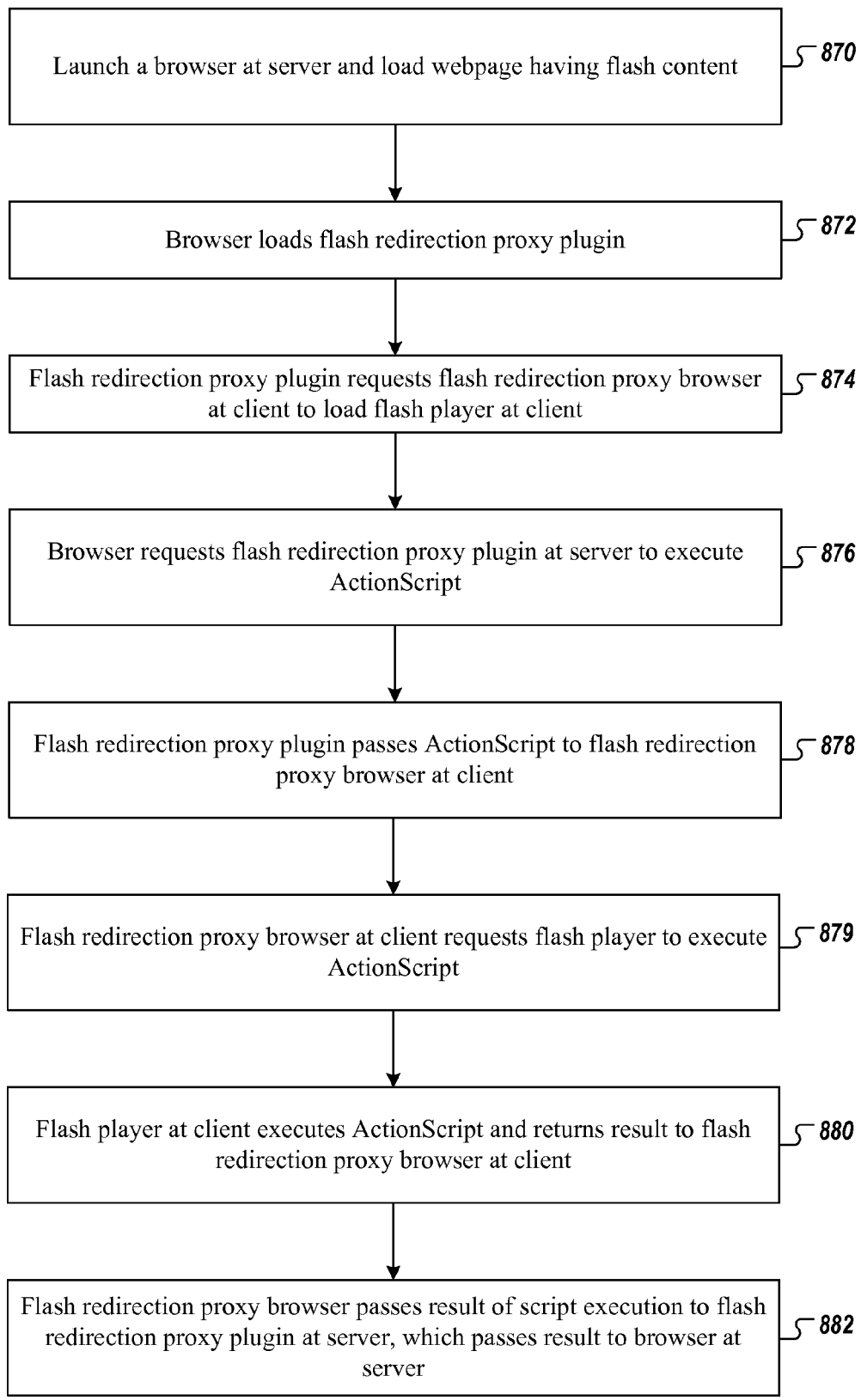

FIG. 8H illustrates the operation of flash redirection in conjunction with the remote execution of ActionScript. At step 870, a browser (e.g. browser 350) is launched at a server (e.g. server 120A), and the browser loads a webpage having flash content. The browser may be, for example, Internet Explorer (typically using ActiveX plugins for flash support), Firefox, Chrome, or another NPAPI browser (using NPAPI plugins for flash). When using flash redirection, the browser may, at step 872, load the flash redirection proxy plugin (e.g. part of redirection module 340). At step 874, the flash redirection proxy plugin may request the flash redirection proxy browser (e.g. part of flash redirection client module 435) to load flash player 210A at the client. In this example, the flash content of the webpage depends on the execution of ActionScript (e.g. the ActionScript code may be embedded inside the flash content), and so at step 876, browser 350 requests the flash redirection proxy plugin at the server to execute the ActionScript. As the flash player capable of executing the ActionScript is located at the client, at step 878, the flash redirection proxy plugin at the server passes the ActionScript to the flash redirection proxy browser so that it may be executed by flash player 210A. At step 879, the flash redirection proxy browser requests flash player 210A to execute the ActionScript. At step 880, the flash player at the client executes the ActionScript and returns the result to the flash redirection proxy browser at the client. At step 882, the flash redirection proxy browser passes the result of the script execution to the flash redirection proxy plugin, which then passes the result to the browser at the server. The client, therefore, may experience playback of flash content that interacts with ActionScript, with the browser executing the ActionScript remotely at the client.

When the browser at the server calls for the execution of an ActionScript function (including, e.g., any of the ActionScript functions described herein), the entire ActionScript function call may be forwarded to the client (e.g. by the flash redirection proxy plugin), and the client (e.g. the flash player at the client) may execute the ActionScript function and return the result to the server (e.g. to the flash redirection proxy plugin). In particular embodiments, there is one result associated with each particular ActionScript function call. If, for example, a particular ActionScript function is called multiple times, then in particular embodiments, each time the function is called, the call is forwarded to the client for remote execution (as described herein), and the result is returned and provided to the browser. In this example, the same result for the same ActionScript function call is returned and provided to the browser (e.g. by the flash redirection proxy plugin) each time the ActionScript function is called. However, in other embodiments, a cache may be maintained at the server (e.g. in memory 315) for the results of ActionScript function calls returned by the client.

As an example, the first time a particular ActionScript function is called, the ActionScript function is forwarded to the client as described above, and the result is returned from the client, cached at the server, and provided to the browser. The next time there is a call to the same ActionScript function, the cache at the server is checked to determine if a result for the same function has already been received from the client. If a result for the function call is available (e.g. is in the cache), then the flash redirection proxy plugin may simply return this result to the browser immediately, without need of forwarding the call to the client to obtain the result. In this manner, it may be possible to avoid excess bandwidth consumption from forwarding repeated ActionScript calls for the same function to the client. Additionally, latencies introduced by the browser at the server waiting for the response from the flash player at the client may also be reduced, potentially providing for smoother flash content playback.

In particular embodiments, ActionScript code may, for example, be included in one or more JavaScript files executed individually or simultaneously by the browser at the server. Example code including an ActionScript function is as follows:
1) var flashElement=document.getElementById("movie_player"); flashElement.GetAPIInterface( );
The code in the above example may, for example, appear in multiple different JavaScript files that are executed by a browser at the server. When executing each of these JavaScript files, the browser invokes the ActionScript function GetAPIInterface( ). When this function is called, the browser may call the function HasMethod(GetAPIInterface) on the flash redirection proxy plugin at the server, and the flash redirection proxy plugin may check the cache at the server to determine if a result for this function has already been received from the client. If a result for the function call is available in the cache (e.g. from execution of a different JavaScript file including the same ActionScript function), then the flash redirection proxy plugin may simply return this result (e.g. TRUE) to the browser from the cache. If the result for the function call is not available (e.g. is not in the cache), the flash redirection proxy plugin may forward the entire ActionScript function call to the flash player at the client. The client (e.g. the flash player) may determine whether the method GetAPIInterface is available to call or not. If it is available, the client may return the result (e.g. the value TRUE) to the server, and the flash redirection proxy plugin at the server may return the result (e.g. TRUE) to the browser.

Figure 8I:
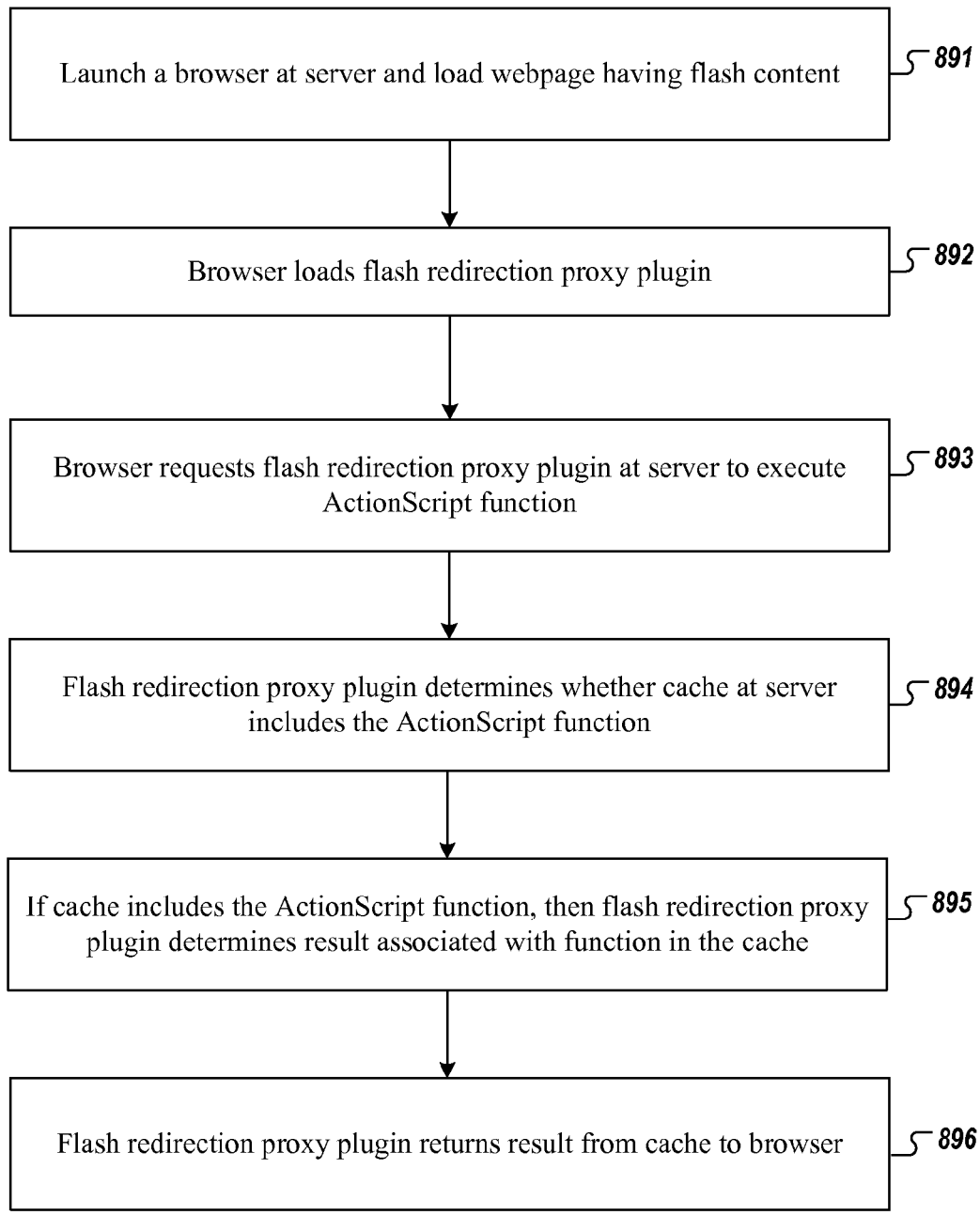
FIG. 8I is an example of flash redirection with script caching.

FIG. 8I illustrates the operation of flash redirection in conjunction with ActionScript calls caching. At step 891, a browser (e.g. 350) is launched at the server (e.g. server 120A), and the browser loads a webpage having flash content (the flash content including, e.g., one or more ActionScript functions). At step 892, the browser loads a flash redirection proxy plugin. At step 893, the browser requests the flash redirection proxy plugin (e.g. part of flash redirection client module 435) at the server to execute a particular ActionScript function. At step 894, the flash redirection proxy plugin determines whether a cache at the server (e.g. in memory 315) includes the ActionScript function. If the cache includes the ActionScript function, then at step 895, the flash redirection proxy plugin determines the result associated with the function in the cache (e.g., the result previously returned by the client when the same ActionScript function was last called). At step 896, the flash redirection proxy plugin then returns the result to the browser, without forwarding the ActionScript function call to the client. If the cache does not include the ActionScript function, then the flash redirection proxy plugin may forward the ActionScript call to the client for execution, as described herein, and may store the result received from the client in the cache.

Figure 10:
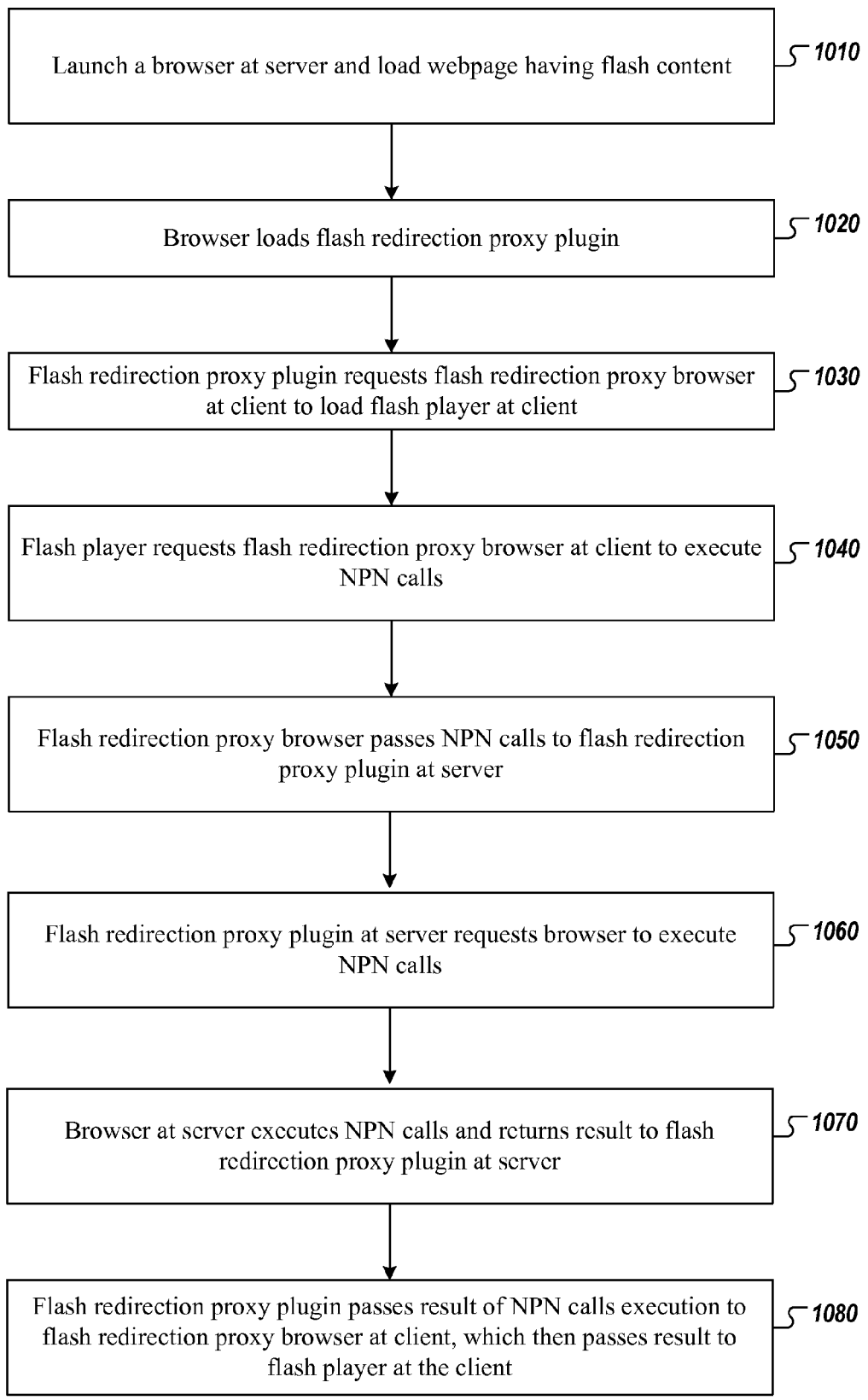
FIG. 10 is an example of flash redirection with remote execution of browser calls.

FIG. 10 illustrates the operation of flash redirection in conjunction with the remote execution of NPN calls. At step 1010, a browser (e.g. browser 350) is launched at a server (e.g. server 120A), and the browser loads a webpage having flash content. The browser may be, for example, Internet Explorer (typically using ActiveX plugins for flash support), Firefox, Chrome, or another NPAPI browser (using NPAPI plugins for flash). When using flash redirection, the browser may, at step 1020, load the flash redirection proxy plugin (e.g. part of redirection module 340). At step 1030, the flash redirection proxy plugin may request the flash redirection proxy browser (e.g. part of flash redirection client module 435) to load flash player 210A. In this example, the flash content of the webpage depends on the execution of one or more NPN calls, and so at step 1040, flash player 210A requests the flash redirection proxy browser at the client to execute the NPN calls. As the browser capable of executing the NPN calls is located at the server, at step 1050, the flash redirection proxy browser passes the NPN calls to the flash redirection proxy plugin so that it may be executed by browser 350. At step 1060, the flash redirection proxy plugin requests browser 350 to execute the NPN calls. At step 1070, the browser at the server executes the NPN calls and returns the result to the flash redirection proxy plugin at the server. At step 1080, the flash redirection proxy plugin passes the result of the NPN call execution to the flash redirection proxy browser, which then passes the result to the flash player at the client. The client, therefore, may experience playback of flash content that interacts with NPN calls, with the flash content rendered locally at the client, and the NPN calls executed remotely at a server.

Example NPN functions include:
1) NPIdentifier NPN_GetStringIdentifier(const NPUTF8*name)
2) void NPN_GetStringIdentifiers(const NPUTF8**names, int32_t nameCount, NPIdentifier*identifiers)
3) NPIdentifier Passthrough_NPN_GetIntIdentifier(int32_t intid)
4) bool Passthrough_NPN_IdentifierIsString(NPIdenfitier identifier)
5) NPUTF8*Passthrough_NPN_UTF8FromIdentifier (NPIdentifier identifier)
6) int32_t Passthrough_NPN_IntFromIdentifier(NPIdentifier identifier)

When the flash player at the client calls an NPN function (including, e.g., any of the NPN function described herein) with a particular string (e.g. a particular name), the entire NPN function call including the string may be forwarded to the server (e.g. by the flash redirection proxy browser), and the server may return an identifier for the particular string from the execution of the NPN call by the browser at the server. In particular embodiments, there is one identifier associated with each string. If, for example, a particular NPN function is called multiple times with a particular string, then in particular embodiments, each time the function is called, the call is forwarded to the server for remote execution (as described herein), and the result (e.g. the identifier for the string) is returned and provided to the flash player. In this example, the same result (e.g. the same identifier) for the same string is returned and provided to the flash player (e.g. by the flash redirection proxy browser) each time the NPN function is called with the string.

However, in other embodiments, a cache may be maintained at the client (e.g. in memory 415) for the results (e.g. the identifiers of strings) of NPN calls returned by the server. As an example, the first time a particular NPN function is called with a particular string, the NPN function call is forwarded to the server as described above, and the result (e.g. the identifier for the string) is returned from the server, cached at the client, and provided to the flash player. The next time there is a call to the same NPN function with the same string, the cache at the client is checked for the string to determine if an identifier for the string has already been received from the server. If an identifier for the string is available (e.g. is in the cache), then the flash redirection proxy browser may simply return this identifier to the flash player immediately, without need of forwarding the call to the server to obtain the identifier. In this manner, it may be possible to avoid excess bandwidth consumption from forwarding repeated NPN calls with the same strings to the server. Additionally, latencies introduced by the flash player at the client waiting for the response from the server may also be reduced, potentially providing for smoother flash content playback.

Figure 11:
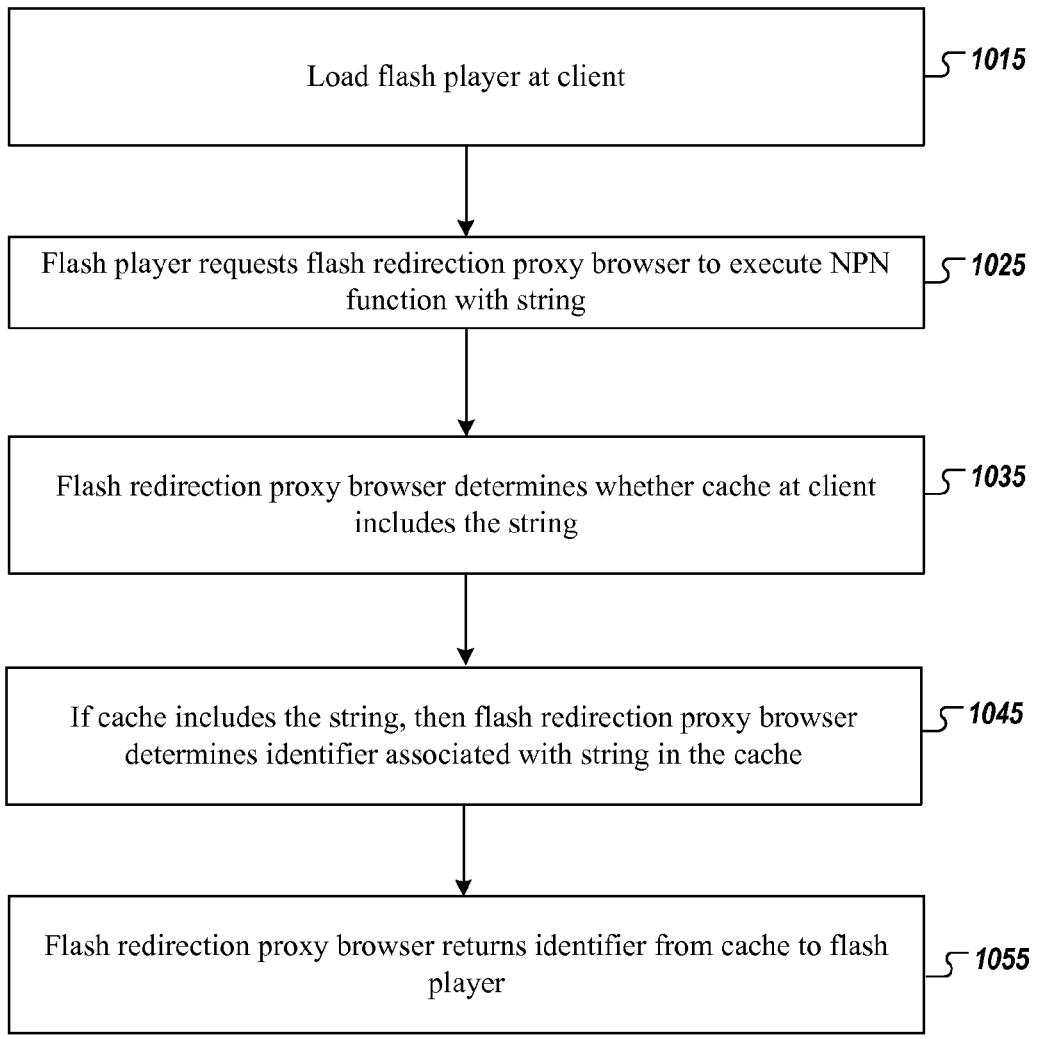
FIG. 11 is an example of flash redirection with browser calls caching.

FIG. 11 illustrates the operation of flash redirection in conjunction with NPN calls caching. At step 1015, a flash player (e.g. 210A) is loaded at the client. At step 1025, the flash player requests the flash redirection proxy browser (e.g. part of flash redirection client module 435) at the client to execute a particular NPN function with a particular string. At step 1035, the flash redirection proxy browser determines whether a cache at the client (e.g. in memory 415) includes the string. If the cache includes the string, then at step 1045, the flash redirection proxy browser determines the identifier associated with the string in the cache (e.g., the identifier previously returned by the server when the same NPN function was last called with the same string). At step 1055, the flash redirection proxy browser then returns the identifier to the flash player, without forwarding the NPN call to the server. If the cache does not include the string, then the flash redirection browser may forward the NPN call to the server for execution, as described herein, and may store the result (e.g. the identifier) received from the server in the cache.

The examples of FIGS. 8G, 8H, 8I, 10, and 11 may be applicable with either internet-based flash redirection or tunnel-based flash redirection.

One example of a process 900A for presenting flash content is illustrated in FIG. 9A and includes the steps 902A, 904A, 906A, 908A, 910A, 912A, 914A, 916A, 918A, 920A, 922A, 924A, 926A, 928A, 930A, 932A, 934A, 936A, and 938A.

As illustrated in FIGS. 8A-8H and 9A-9C, a client or client computing device may be, for example, a client implementing a Wyse TCX® client application (or any similar remote desktop protocol client application), and a server or remote desktop server may be, for example, a server implementing a Wyse TCX® server application (or any similar remote desktop protocol server application).

OTHER REMARKS

In one aspect, any of the clauses herein may depend from any one of the independent clauses or any one of the dependent clauses. In one aspect, any of the clauses (e.g., dependent or independent clauses) may be combined with any other clauses (e.g., dependent or independent clauses). In one aspect, a claim may include some or all of the words (e.g., steps, operations, means or components) recited in a clause, a sentence, a phrase or a paragraph. In one aspect, a claim may include some or all of the words recited in one or more clauses, sentences, phrases or paragraphs. In one aspect, some of the words in each of the clauses, sentences, phrases or paragraphs may be removed. In one aspect, additional words or elements may be added to a clause, a sentence, a phrase or a paragraph. In one aspect, the subject technology may be implemented without utilizing some of the components, elements, functions or operations described herein. In one aspect, the subject technology may be implemented utilizing additional components, elements, functions or operations.

In one aspect, any methods, instructions, code, means, logic, components, blocks, modules and the like (e.g., software or hardware) described or claimed herein can be represented in drawings (e.g., flow charts, block diagrams), such drawings (regardless of whether explicitly shown or not) are expressly incorporated herein by reference, and such drawings (if not yet explicitly shown) can be added to the disclosure without constituting new matter. For brevity, some (but not necessarily all) of the clauses/descriptions/claims are explicitly represented in drawings, but any of the clauses/descriptions/claims can be represented in drawings in a manner similar to those drawings explicitly shown. For example, a flow chart can be drawn for any of the clauses, sentences or claims for a method such that each operation or step is connected to the next operation or step by an arrow. In another example, a block diagram can be drawn for any of the clauses, sentences or claims having means-for elements (e.g., means for performing an action) such that each means-for element can be represented as a module for element (e.g., a module for performing an action).

Those of skill in the art would appreciate that items such as the various illustrative blocks, modules, elements, components, methods, operations, steps, and algorithms described herein (e.g., the client computing device 110A, the server 120A, the proxy server 130A, the flash content server 150A, and the components therein) may be implemented as hardware, computer software, or a combination of both.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (e.g., one or more of blocks, modules, elements, components or processors) for performing one or more functions or operations. In one aspect, such an item may be an apparatus, hardware, or a portion thereof. In one example, an item may have a structure in the form of, for example, an instruction(s) for performing the function(s) or operation(s), where the instruction(s) are encoded or stored on a machine-readable medium, on another device, or on a portion thereof, where an instruction(s) may be software, an application(s), a subroutine(s), or a portion thereof. In an example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (e.g., a digital signal processor (DSP), an application specific integrated circuit (ASIC), a field programmable gate array (FPGA), etc.). Those skilled in the art will recognize how to implement the instructions, circuits, and processing systems.

A reference to an element in the singular is not intended to mean "one and only one" unless specifically so stated, but rather "one or more." For example, a server may refer to one or more servers, a tunnel may refer to one or more tunnels, a connection may refer to one or more connections, etc.

Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The word "exemplary" is used herein to mean "serving as an example or illustration." Any aspect or design described herein as "exemplary" is not necessarily to be construed as preferred or advantageous over other aspects or designs. In one aspect, various alternative configurations and operations described herein may be considered to be at least equivalent.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect of the disclosure, when actions or functions are described as being performed by an item (e.g., receiving, determining, fetching, creating, providing, generating, converting, displaying, playing, notifying, accepting, selecting, controlling, transmitting, reporting, sending, or any other action or function), it is understood that such actions or functions may be performed by the item directly or indirectly. In one aspect, when a module is described as performing an action, the module may be understood to perform the action directly. In one aspect, when a module is described as performing an action, the module may be understood to perform the action indirectly, for example, by facilitating, enabling or causing such an action.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled.

Various items may be arranged differently (e.g., arranged in a different order, or partitioned in a different way) all without departing from the scope of the subject technology.

In one example, the subject technology may be implemented without use of the proxy server 130A or without use of the tunnel 230A. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This scope of this disclosure encompasses all changes, substitutions, variations, alterations, and modifications to the example embodiments herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   at a server, loading in a browser a webpage comprising flash content including an ActionScript, the ActionScript including at least one function;
   in the browser, loading a flash redirection plugin;
   by the browser, requesting the plugin to execute the ActionScript;
   by the plugin, determining whether a cache at the server includes the function; and
   if the cache includes the function, by the plugin:
      determining a result associated with the function in the cache; and
      returning the result to the browser;
   if the cache does not include the function, by the plugin:
      passing the ActionScript to a flash redirection browser at a client;
      receiving the result of executing the ActionScript;
      storing the result and the function in the cache; and
      providing the result to the browser.

2. The method of claim 1, wherein the client comprises a flash player, and wherein the flash player is operable to receive the ActionScript from the flash redirection browser, execute the ActionScript, and provide the result of executing the ActionScript to the flash redirection browser.

3. The method of claim 1, wherein the server is remote from the client.

4. The method of claim 1, wherein the flash content comprises a plurality of flash content items of the webpage.

5. The method of claim 1, wherein the flash content interacts with the ActionScript.

6. The method of claim 1, wherein the flash redirection plugin is operable with multiple browsers.

7. One or more computer-readable non-transitory storage media embodying logic that is operable when executed to:
   at a server, loading in a browser a webpage comprising flash content including an ActionScript, the ActionScript including at least one function;
   in the browser, loading a flash redirection plugin;
   by the browser, requesting the plugin to execute the ActionScript;
   by the plugin, determining whether a cache at the server includes the function; and
   if the cache includes the function, by the plugin:
      determining a result associated with the function in the cache; and
      returning the result to the browser;
   if the cache does not include the function, by the plugin:
      passing the ActionScript to a flash redirection browser at a client;
      receiving the result of executing the ActionScript;
      storing the result and the function in the cache; and
      providing the result to the browser.

8. The media of claim 7, wherein the client comprises a flash player, and wherein the flash player is operable to receive the ActionScript from the flash redirection browser, execute the ActionScript, and provide the result of executing the ActionScript to the flash redirection browser.

9. The media of claim 8, wherein the server is remote from the client.

10. The media of claim 7, wherein the server is remote from the client.

11. The media of claim 7, wherein the flash content comprises a plurality of flash content items of the webpage.

12. The media of claim 7, wherein the flash content interacts with the ActionScript.

13. The media of claim 7, wherein the flash redirection plugin is operable with multiple browsers.

14. A system comprising:
   one or more processors; and
   a memory coupled to the processors comprising instructions executable by the processors, the processors being operable when executing the instructions to:
      at a server, load in a browser a webpage comprising flash content including an ActionScript, the ActionScript including at least one function;
      in the browser, load a flash redirection plugin;
      by the browser, request the plugin to execute the ActionScript;
      by the plugin, determine whether a cache at the server includes the function; and
      if the cache includes the function, by the plugin:
         determine a result associated with the function in the cache; and
         return the result to the browser;

if the cache does not include the function, by the plugin:
- pass the ActionScript to a flash redirection browser at a client;
- receive the result of executing the ActionScript;
- store the result and the function in the cache; and
- provide the result to the browser.

15. The system of claim 14, wherein the client comprises a flash player, and wherein the flash player is operable to receive the ActionScript from the flash redirection browser, execute the ActionScript, and provide the result of executing the ActionScript to the flash redirection browser.

16. The system of claim 14, wherein the server is remote from the client.

17. The system of claim 14, wherein the flash content comprises a plurality of flash content items of the webpage.

* * * * *